United States Patent [19]
Kusaka et al.

[11] Patent Number: 6,148,153
[45] Date of Patent: *Nov. 14, 2000

[54] FOCUS DETECTION DEVICE AND FOCUS DETECTION METHOD

[75] Inventors: Yosuke Kusaka, Yokohama; Shigeyuki Uchiyama; Shozo Yamano, both of Tokyo; Tsutomu Narisawa, Saitama-ken, all of Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/892,909

[22] Filed: Jul. 15, 1997

Related U.S. Application Data

[60] Division of application No. 08/563,483, Nov. 28, 1995, Pat. No. 5,701,524, which is a continuation-in-part of application No. 08/323,720, Oct. 18, 1994, abandoned.

[30] Foreign Application Priority Data

Oct. 29, 1993 [JP] Japan ................................ 5-272626

[51] Int. Cl.[7] .......................... G03B 13/18; G03B 13/32; G03B 13/34
[52] U.S. Cl. ............................................. 396/123; 396/96
[58] Field of Search ............................... 396/96, 121–123

[56] References Cited

U.S. PATENT DOCUMENTS

| | | | |
|---|---|---|---|
| 4,812,912 | 3/1989 | Iida et al. ................................ | 354/402 |
| 4,835,615 | 5/1989 | Taniguchi et al. . | |
| 4,878,079 | 10/1989 | Hamada et al. . | |
| 4,979,045 | 12/1990 | Taniguchi et al. . | |
| 5,068,682 | 11/1991 | Utagawa ................................ | 354/408 |
| 5,068,737 | 11/1991 | Taniguchi et al. . | |
| 5,121,152 | 6/1992 | Wagner . | |
| 5,128,705 | 7/1992 | Someya et al. . | |
| 5,151,732 | 9/1992 | Akashi et al. . | |
| 5,189,465 | 2/1993 | Akashi et al. .......................... | 354/408 |
| 5,218,395 | 6/1993 | Taniguchi et al. . | |
| 5,227,833 | 7/1993 | Ishida et al. . | |
| 5,307,112 | 4/1994 | Aoyama . | |
| 5,392,088 | 2/1995 | Abe et al. ............................... | 354/402 |
| 5,393,639 | 2/1995 | Ohsawa .................................. | 250/201 |
| 5,434,639 | 7/1995 | Kusaka .................................. | 354/408 |
| 5,483,318 | 1/1996 | Hamada et al. ........................ | 354/402 |
| 5,594,504 | 1/1997 | Suzuki .................................... | 396/96 |
| 5,701,524 | 12/1997 | Kusaka et al. ........................ | 396/123 |
| 5,758,210 | 5/1998 | Hamada et al. ........................ | 396/121 |

*Primary Examiner*—Russell Adams
*Assistant Examiner*—Christopher Mahoney
*Attorney, Agent, or Firm*—Oliff & Berridge PLC.

[57] ABSTRACT

The area in which focus detection is performed is selected from among a plurality of focus detection areas provided on a photography screen. In the pair of photoelectric converters corresponding to the selected focus detection area, charge accumulation is repeatedly performed based on at least one of the image signals from the pair of image signals output from this pair of photoelectric converters. The focus adjustment condition of the photograph optical system is computed based on this pair of image signals. In the pair of photoelectric converters corresponding to the non-selected focus detection areas, charge accumulation is repeatedly performed over a period longer than the period of charge accumulation in the pair of photoelectric converters corresponding to the selected focus detection area based on at least one of the image signals from the pair of image signals output from this pair of photoelectric converters. The structure and method improve the responsiveness of focus detection when the focus detection area is changed without causing the responsiveness of normal focus detection to decline.

6 Claims, 15 Drawing Sheets

FOCUS DETECTION DEVICE AND FOCUS DETECTION METHOD

This is a Division of application Ser. No. 08/563,483 filed Nov. 28,1995, now U.S. Pat. No. 5,701,524 which in turn is a Continuation-in-Part of application Ser. No. 08/323,720 filed Oct. 18, 1994, now abandoned.

BACKGROUND OF THE INVENTION

1. Field of the Invention

The present invention relates to a focus detection method and a focus detection device, wherein the focus adjustment condition of the photography lens is detected in a plurality of focus detection areas.

2. Description of Related Art

A focus detection device has been known in which an arbitrary focus detection area can be selected from among a plurality of focus detection areas provided on the photography screen. For instance, in auto focus cameras, several focus detection areas are provided in the center of and along the periphery of the photography screen, the photographer can select an arbitrary focus detection area using an operation part provided on the camera body, and the focus adjustment condition of the photography lens is detected in the selected focus detection area.

A charge accumulation type image sensor such as a CCD or the like is generally used as the light receptor in the aforementioned focus detection device.

When focus detection is performed using a charge accumulation type image sensor, it is necessary for the subject image signal output from the image sensor to be at an appropriate level with respect to the processing circuit that processes it. For instance, when the subject image signal is processed digitally by a microcomputer, if the subject image signal is not kept at a certain level without exceeding the A/D conversion input range of the A/D converter built into the microcomputer, the quantization errors can occur in A/D conversion, causing deterioration of the focus detection accuracy.

In order to keep the subject image signal at a suitable level over the range of brightness from dim to bright light, the accumulation time of the charge accumulation type image sensor is controlled. For instance, if the current accumulation time Tn is determined, as shown in equation 1, using the target peak value Px and the peak value Pn−1 and accumulation time Tn1 of the previous subject image signal, the subject image signal can be maintained at a suitable level for focus detection computation without exceeding the A/D conversion range.

$$Tn = Tn-1 * Px/Pn-1 \qquad (1)$$

However, the focus detection device described above has the following problems.

When the focus detection area is changed, in order to initialize the charge accumulation type image sensor corresponding to the newly selected focus detection area and keep the subject image signal output from this image sensor at a level suitable for focus detection computation, it is necessary to repeat the accumulation time control cycle of equation (1) numerous times.

Because no previous subject image signal data exists after initialization, image sensor charge accumulation is performed by setting an accumulation time corresponding to a certain preset brightness. However, because the brightness of the subject can change by a factor of nearly 2 to the 20th power, when there is a large difference between the actual subject brightness and the set brightness, the peak value of the subject image signal obtained is too high, the numerical value becomes 0 through quantization, and computation of the next accumulation time using equation (1) becomes impossible. In this case, the control process of setting the next accumulation time as a fraction of the present accumulation time when the peak value of the subject image signal is too high and setting the next accumulation time as a multiple of the present accumulation time when the peak value of the subject image is below a preset value must be repeated, and only when the peak value of the subject image signal falls within a preset range can equation (1) finally be applied.

Accordingly, there is a delay in the output of focus detection results when the focus detection area is changed, and because of this, focus detection responsiveness is poor.

In order to improve the focus detection responsiveness when the focus detection area is changed, focus detection can be performed at all times even in image sensors that correspond to focus detection areas that have not been selected. However, A/D conversion and focus detection computations are performed with a single microcomputer in order to keep costs down, and if it is necessary to perform focus detection computation and A/D conversion on subject image signals output from image sensors for focus detection areas not selected in addition to focus detection computation and A/D conversion of subject image signals output from the selected focus detection area, the time required for the focus detection cycle would increase, and consequently, the responsiveness of the normal focus detection action would decline.

SUMMARY OF THE INVENTION

It is an object of the present invention to improve the responsiveness of focus detection when the focus detection area is changed, without causing the responsiveness of normal focus detection to decline.

This and other objects are achieved by providing a plurality of pairs of charge accumulation type photoelectric converters that are provided in correspondence to a plurality of focus detection areas on the photography screen of a photography optical system. The converters output image signals corresponding to the light intensity distribution of the subject image formed by the optical system. A focus detection computation device computes the focus adjustment condition of the photography optical system based on the pairs of image signals output from the photoelectric converters; an accumulation control controls the charge accumulation of the photoelectric converters based on at least one image signal from the pair of image signals output from the photoelectric converters; an area selection device selects the area where focus detection is performed from among the plurality of focus detection areas. A sequence controller, in the photoelectric converters corresponding to the selected focus, controls the accumulation control to repeatedly perform charge accumulation based on the pair of image signals output from the photoelectric converters over a first time period. In the photoelectric converters corresponding to the focus detection areas not selected by the area selection device, the sequence controller controls the accumulation control to repeatedly perform charge accumulation over a second time period longer than the first time period.

The system may include a transmitter that transmits the image signal output from each photoelectric converter to the focus detection computation device. The sequence control in the photoelectric converters corresponding to the selected focus detection area may control at least one of the transmitter and the focus detection computation device, giving it priority over the transmittance. action and the accumulation time computation action in the photoelectric converters corresponding to the non-selected focus detection areas.

In accordance with another aspect of the invention, there is provided a plurality of pairs of charge accumulation type photoelectric converters that are provided in correspondence to a plurality of focus detection areas on the photography screen of a photography optical system and that output image signals corresponding to the light intensity distribution of the subject image formed by the optical system; a focus detection computation device that computes the focus adjustment condition of the photography optical system based on the pairs of image signals output from the pairs of photoelectric converters; an accumulation control that computes the charge accumulation time based on at least one image signal from the pair of image signals output from the photoelectric converters and controls the charge accumulation in these photoelectric converters; a plurality of monitors that each output a signal corresponding to the intensity of light incident on the photoelectric converters; an area selection device that selects the area where focus detection is performed from among the plurality of focus detection areas; and a sequence controller that, in the photoelectric converters corresponding to the selected focus detection area controls the accumulation control to repeatedly perform charge accumulation and controls the focus detection computation device to perform focus detection computation based on the pair of image signals output from these photoelectric converters. In the photoelectric converters corresponding to the non-selected focus detection areas, the sequence controller prevents charge accumulation and also controls the monitor to monitor the light intensity.

When the focus detection area is changed by the area selection device, the sequence control computes a charge accumulation time using the accumulation control based on the results of monitoring the light intensity using the monitors of these photoelectric converters upon charge accumulation immediately following the change to the photoelectric converters that correspond to the newly selected focus detection area, and controls the accumulation control to perform charge accumulation during the computed charge accumulation time.

In yet another aspect of the invention, the invention is equipped with a plurality of charge accumulation type photoelectric converters that are provided in correspondence to a plurality of focus detection areas on the photography screen of a photography optical system, and that output image signals corresponding to the light intensity distribution of the subject image formed by the optical system. A focus detection computation device computes the focus adjustment condition of this photography optical system based on the pairs of image signals output from the photoelectric converters; an accumulation control that controls the charge accumulation of the photoelectric converters based on at least one image signal from the pair of image signals output from the photoelectric converters; a block selection device that selects the block in which focus detection is performed from among a plurality of focus detection blocks, with this plurality of focus detection blocks composed by grouping the plurality of focus detection areas into blocks of adjacent focus detection areas; and a sequence controller. In the focus detection block selected by the block selection device, the sequence controller controls the accumulation control to repeatedly perform charge accumulation in the photoelectric converters corresponding to the focus detection areas that belong to this focus detection block and also controls the focus detection computation device to perform focus detection computation based on the pair of image signals output from the photoelectric converters. In the focus detection block not selected by the block selection device, the sequence controller controls the accumulation control to repeatedly perform charge accumulation in the photoelectric converters corresponding to a specific focus detection area that belongs to this focus detection block.

The plurality of focus detection areas that belong to each focus detection block may be arranged so as to be mutually intertwined.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

First Embodiment

Figure 1:
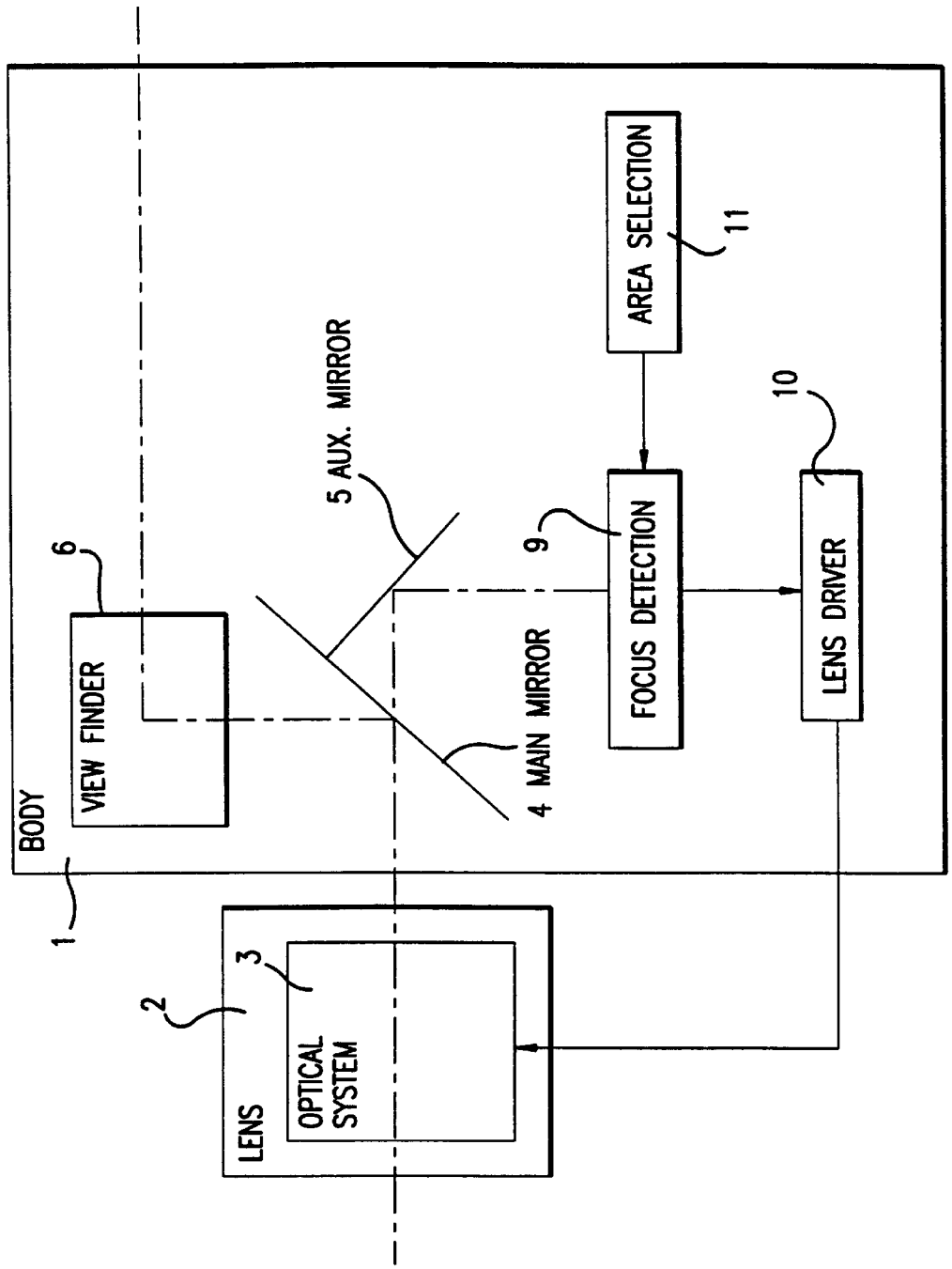
FIG. 1 is a block drawing showing the structure of a camera equipped with the focus detection device of a first embodiment.

FIG. 1 shows the structure of a camera equipped with a focus detection device according to a first embodiment.

The lens 2 is structured so as to be removable from the body 1. The drawing shows a condition wherein the lens 2 is mounted on the body 1. A photography optical system 3 is disposed inside the lens 2, and light rays from the subject that pass through the photography optical system 3 are divided toward the auxiliary mirror 5 and the viewfinder 6 by a main mirror 4, which is a half mirror.

Light rays that are further deflected toward the bottom of the body by the auxiliary mirror 5 are guided to a focus detection device 9, which is positioned near the intended focus surface of the photography optical system 3.

The focus detection device 9 comprises a focus detection optical system, a charge accumulation type sensor and a focus detection computation part comprised of a microcomputer. The device 9 detects the focus adjustment condition of the photography optical system, controls driving of the lens driving device 10 in accordance with the results of this detection, and moves the photography optical system 3, which is linked to the lens driving device 10, in the direction of the optical axis to focus the system. The lens driving device 10 is preferably a motor or the like.

The area selection device 11 is used to select the area in which focus detection is performed from among the plurality of focus detection areas provided on the photography screen. The device 11 is operated either automatically or manually by the photographer depending on the photography mode of the camera. The focus detection device 9 performs either automatic focus adjustment or focus detection in the area selected by the area selection device 11.

Figure 2:
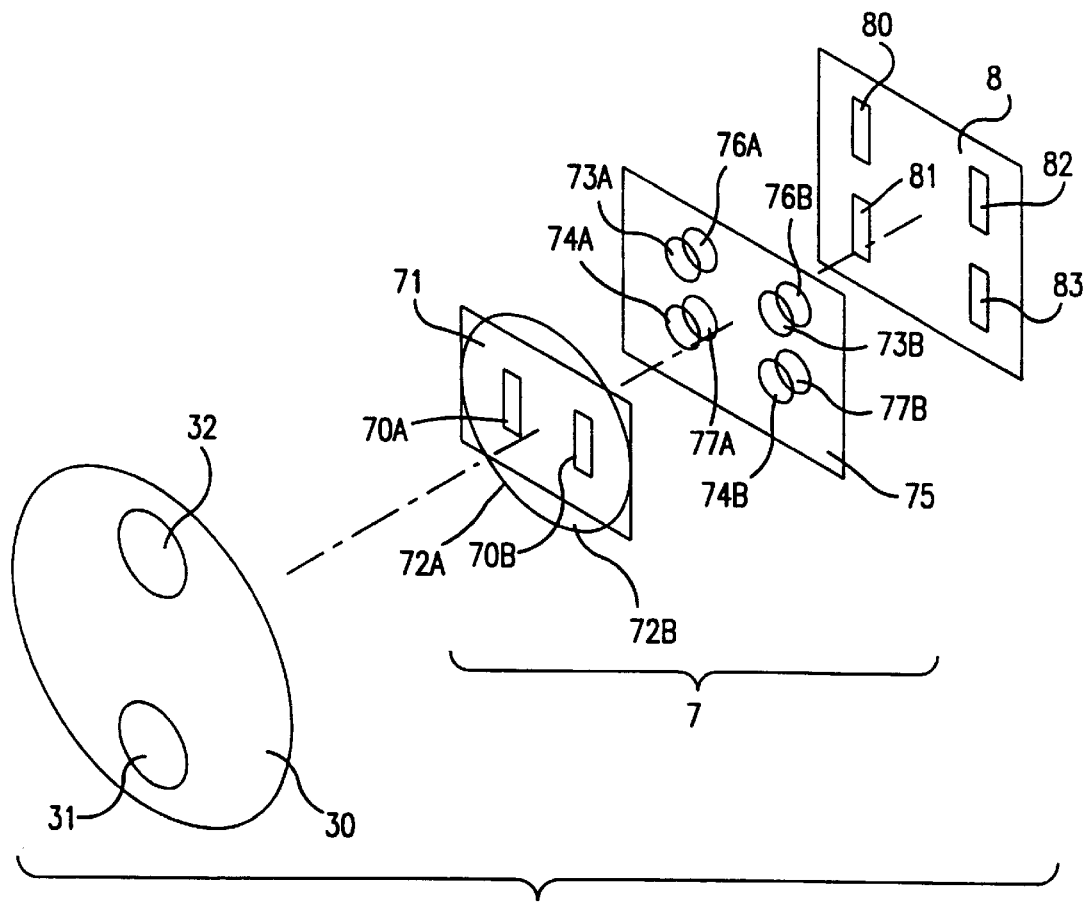
FIG. 2 is an oblique view showing the structure of the focus detection optical system and the charge accumulation type image sensor.

FIG. 2 shows an example of the structure of the focus detection optical system and charge accumulation type image sensors.

The focus detection optical system 7 is composed of a field of vision mask 71 containing apertures 70A and 70B, condenser lenses 72A and 72B, a diaphragm mask 75 containing two pairs of diaphragm apertures 73A, 74A, 73B and 74B, and two pairs of reimaging lenses 76A, 77A, 76B and 77B. In addition, the charge accumulation type sensor 8 is equipped with two pairs of light receptors 80, 81, 82 and 83. Each of the light receptors 80, 81, 82 and 83 is comprised of a plurality of pixels.

In the structure described above, the two pairs of diaphragm apertures 73A, 74A, 73B and 74B are focused by the condenser lenses 72A and 72B onto a pair of regions 31 and 32, symmetric with respect to the optical axis, on a surface 30 near the exit pupil of the photography optical system 3, and light that passes through these regions is formed first as a primary image in the vicinity of the field of vision mask 71. The primary image formed on the apertures 70A and 70B of the field of vision mask 71 passes through the condenser lenses 72A and 72B and the two pairs of diaphragm apertures 73A, 74A, 73B and 74B, and is formed as two pairs of secondary images by the two pairs of reimaging lenses 76A, 77A, 76B and 77B on the light receptors 80, 81, 82 and 83 of the charge accumulation type sensor 8.

With this structure, the relationship between the relative positions of the pair of secondary images on light receptors 80 and 81 and the relationship between the relative positions of the pair of secondary images on light receptors 82 and 83 changes according to the focus condition of the photography optical system 3.

The start and end of charge accumulation in light receptors 80 and 81 and in light receptors 82 and 83 can be controlled independently of each other, and both light receptors 80 and 81 and light receptors 82 and 83 begin accumulating charge when a charge accumulation start signal is received, and finish accumulating charge when a charge accumulation termination signal is received. Furthermore, through a commonly known CCD shift register mounted parallel to the light receptors, electric charge accumulated in the light receptors 80, 81, 82 and 83 is serially transmitted to the outside in units of pixels as an analog subject image signal in accordance with a transmittance pulse signal.

Accordingly, the light intensity distribution of the two pairs of secondary images is photoelectrically converted by light receptors 80 and 81 and light receptors 82 and 83 and is output as electrical subject image signals. By detecting the relative positions of these pairs of secondary images based on these subject image signals, it is possible to detect the focus adjustment condition of the photography optical system 3.

Figure 3:
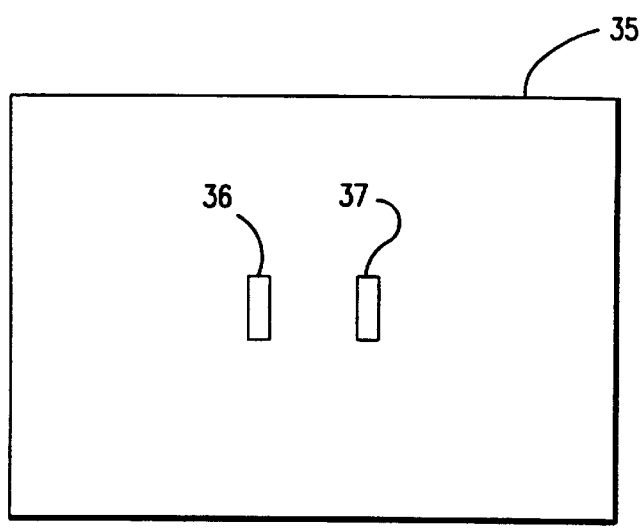
FIG. 3 is a drawing showing the positioning of the focus detection regions on the photography screen.

In addition, as shown in FIG. 3, through the structure described above, a first focus detection area 36 corresponding to light receptors 80 and 81 and a second focus detection area 37 corresponding to light receptors 82 and 83 are provided on the photography screen 35. Hereinafter, light receptors 80 and 81 will be called the first light receptors, and light receptors 82 and 83 will be called the second light receptors.

Figure 4:
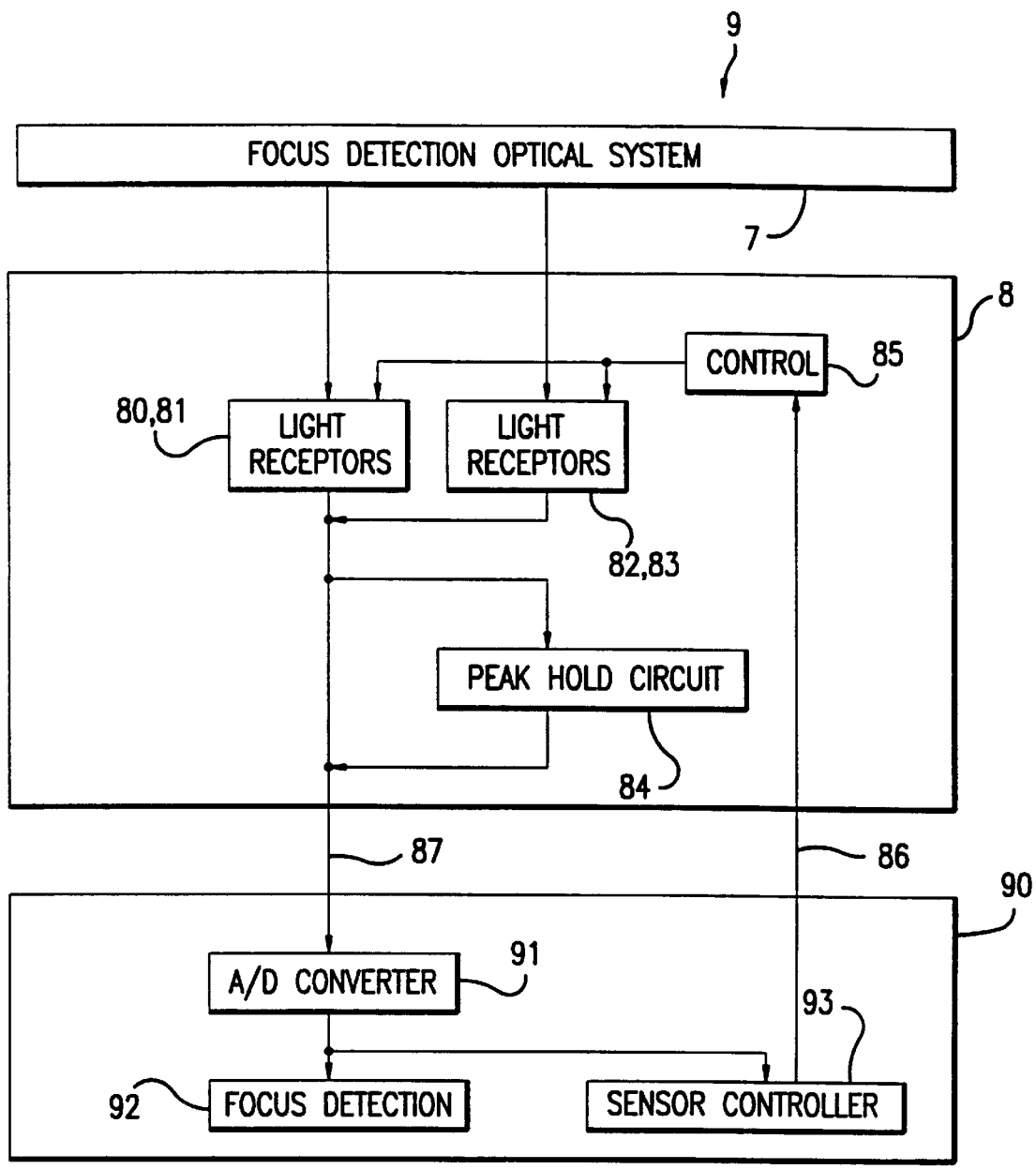
FIG. 4 is a block drawing showing the structure of the first embodiment.

Next, FIG. 4 is a block diagram showing the structure of the focus detection device 9.

The focus detection device 9 is equipped with the focus detection optical system 7 described above, the charge accumulation type image sensor 8 described above, and a microcomputer 90.

The image sensor 8 is equipped with the first light receptors (the pair of light receptors 80 and 81 described above), the second light receptors (the pair of light receptors 82 and 83 described above), a peak hold circuit 84 that detects the peak value of the output signal from the first light receptors and the second light receptors, and a control circuit 85 that produces a control signal in order to control accumulation and transmittance in the first light receptors and the second light receptors. This structure is formed as a single chip on the surface of the same semiconductor board.

The microcomputer 90 performs computations used for focus detection and control of the accumulation action in first light receptors 80 and 81 and second light receptors 82 and 83, and it is equipped with an A/D converter 91, a focus detection computer 92 and a sensor controller 93.

Next, the operation of the focus detection device 9 will be described.

First light receptors 80 and 81 and second light receptors 82 and 83 perform charge accumulation only for a specific accumulation time based on a control signal from the control circuit 85, produce a pair of subject image signals corresponding to the light intensity distribution of the subject image on each of the light receptors by the focus detection optical system 7, and output the subject image signals to the microcomputer 90 via a common output line 87. The method of determining the charge accumulation time is explained hereinafter.

So that the output of first light receptors 80 and 81 and second light receptors 82 and 83 is not simultaneously output to the common output line 87, the accumulation timing of first light receptors 80 and 81 and second light receptors 82 and 83 is controlled.

The peak hold circuit 84 is arranged in parallel with the output line 87, and while the subject image signals from first light receptors 80 and 81 and second light receptors 82 and 83 are being transmitted, it detects and stores the peak value (the signal value corresponding to the area that is brightest) of the subject image signals, and when the output and transmittance of the subject image signals has been completed, it outputs the detected peak values to the outside via the output line 87.

Figure 5:
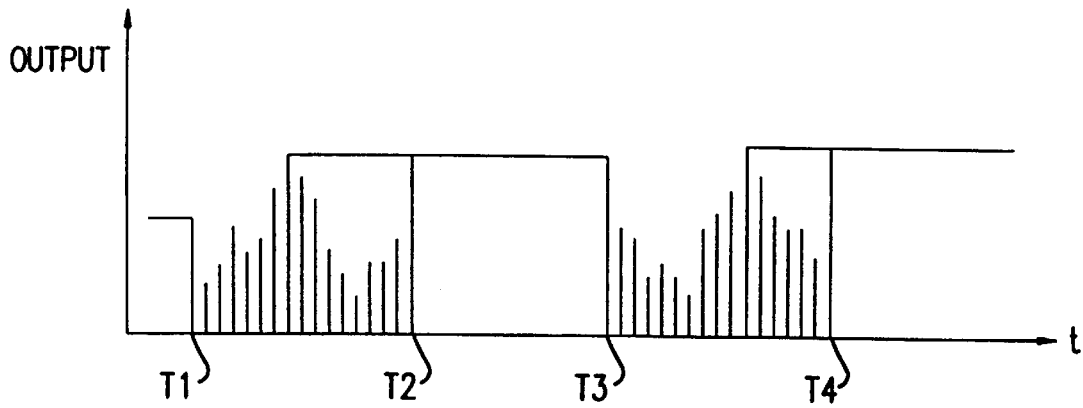
FIG. 5 is a time chart showing the output of the image sensor.

FIG. 5 is a time chart of the subject image signal output from the image sensor 8.

At time T1, accumulation has been completed in first light receptors 80 and 81, and the transmittance of the charge accumulated in first light receptors 80 and 81 is started. During the interval between time T1 and time T2, the signal from each pixel is output in accordance with the transmittance pulse signal. When transmittance is completed at time T4, the peak value of the subject image signals output during the interval from time T1 to time T2 is output as a peak signal. In addition, when accumulation is completed in second light receptors 82 and 83 at time T3, and the transmittance of the charge accumulated in second light receptors 82 and 83 is started, subject image signals are output instead of the peak signal, and during the interval from time T3 to time T4, the signal from each pixel is output in accordance with the transmittance pulse signal. When transmittance is completed at time T4, the peak value of the subject image signals output during the interval from time T3 to time T4 is output as a peak signal.

The A/D converter 91 is connected to the output line 87, and it performs A/D conversion on the subject image signals and peak signals.

The focus detection computer 92 detects the focus adjustment condition of the first focus detection area 36 based on the subject image data corresponding to first light receptors 80 and 81, which has been A/D converted when the first focus detection area 36 is selected by the area selection device 11. When the second focus detection area 37 is selected by the area selection device 11, it detects the focus adjustment condition of the second focus detection area 37 based on the A/D converted subject image data corresponding to second light receptors 82 and 83.

The sensor controller 93 determines the accumulation time of first light receptors 80 and 81 and second light receptors 82 and 83 so that the output level of the subject image signals output from first light receptors 80 and 81 and second light receptors 82 and 83 is within the A/D conversion range of the A/D converter 91, and it controls the accumulation time of first light receptors 80 and 81 and second light receptors 82 and 83 by sending commands to the controller circuit 85 via the control line 86.

When the A/D value of the peak signal corresponding to first light receptors 80 and 81 is called PA, the accumulation time when this peak signal PA was obtained is called TAP, the A/D value of the peak signal corresponding to second light receptors 82 and 83 is called PB, the accumulation time when this peak signal PB was obtained is called TBP, and the target peak value is called PX, the next accumulation times TAN and TBN for first light receptors 80 and 81 and second light receptors 82 and 83 are computed using equation 2.

$$TAN=TAP*PX/PA$$
$$TBN=TBP*PX/PB \qquad (2)$$

By determining the next accumulation times in this way, it can be expected that the next peak value will be the target value PX.

Figure 6:
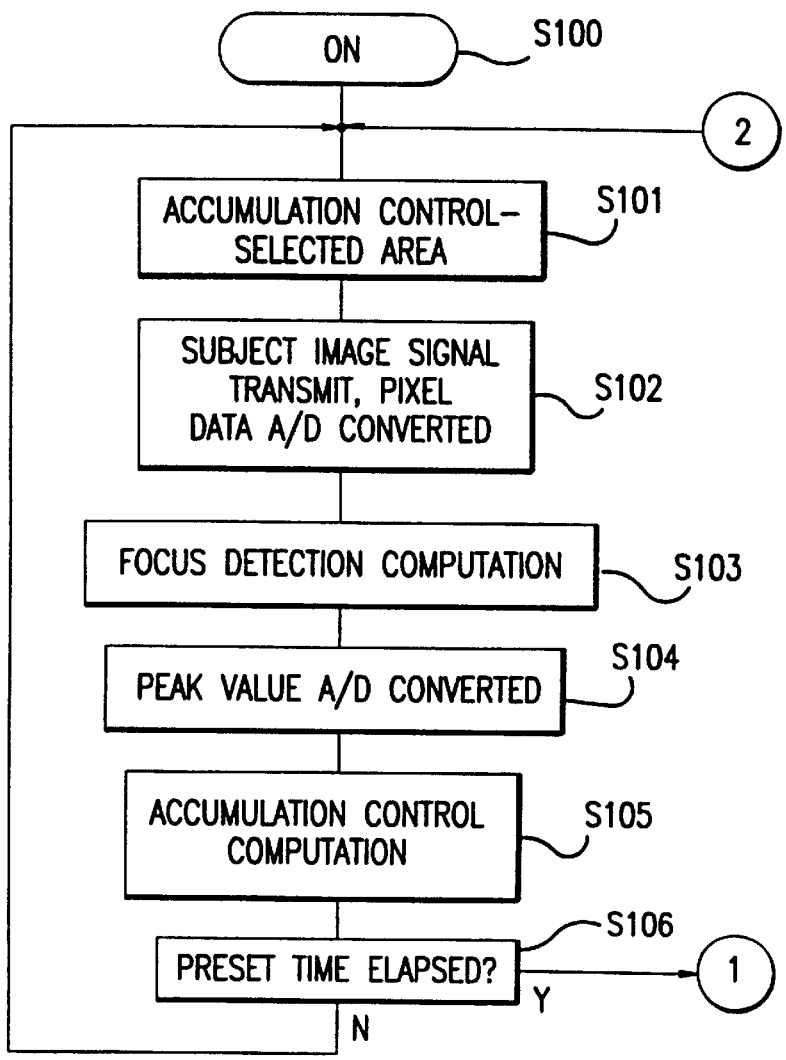
FIG. 6 is a flowchart of the actions of the microcomputer in the first embodiment.
Figure 7:
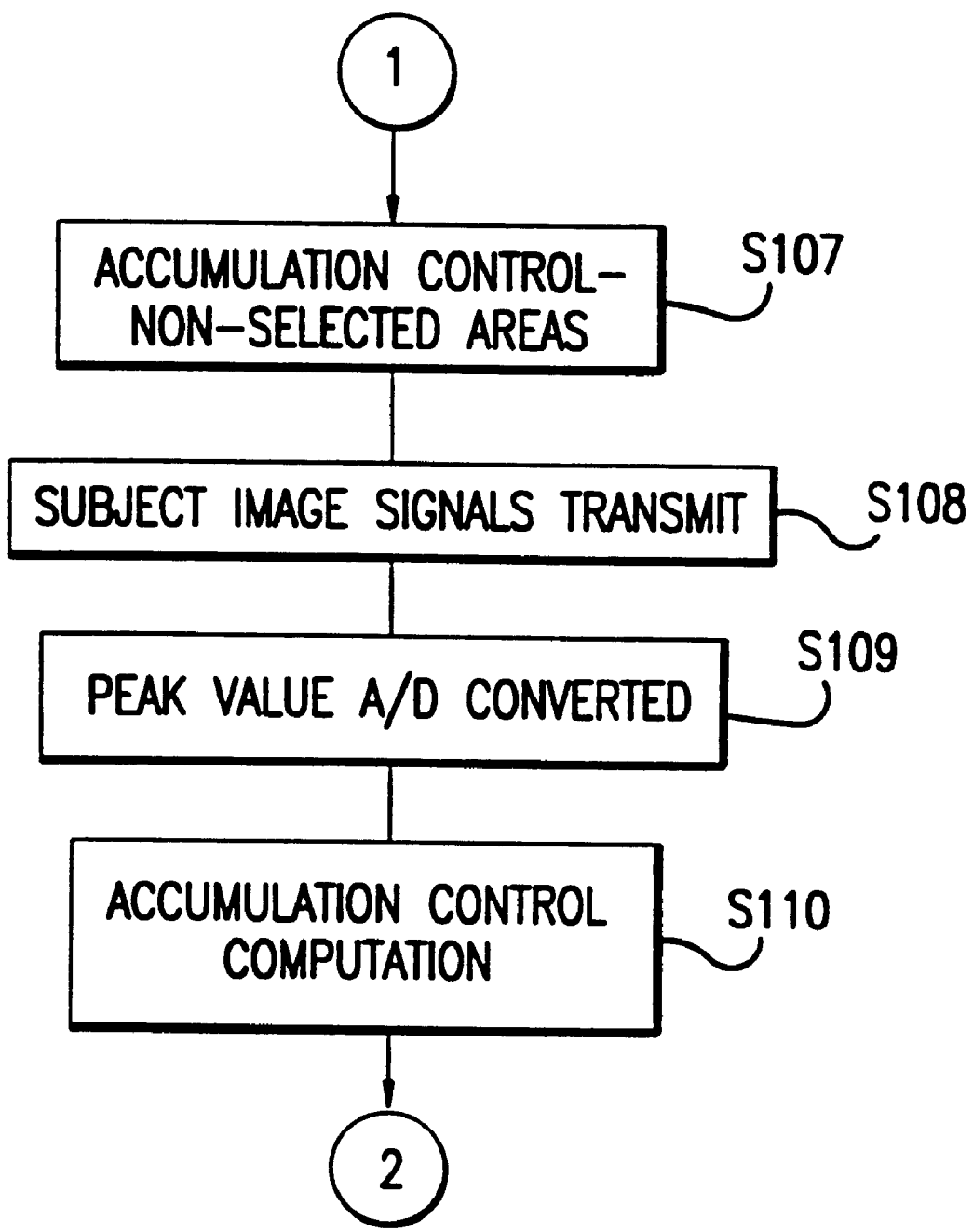
FIG. 7 is a flowchart of the actions of the microcomputer in the first embodiment, following FIG. 6.

FIGS. 6 and 7 are flowcharts of the actions of the microcomputer 90 in the first embodiment.

In step S100, the power source is turned on, and the microcomputer advances to step S101. At this time, a timer inside the microcomputer is started. In step S101, control of the accumulation time is performed in the light receptors corresponding to the focus detection area that has been selected by the area selection device 11. The explanation below presumes that the first focus detection area 36 has been selected. In this case, the charge accumulation action is performed in first light receptors 80 and 81. Because equation 2 cannot be applied immediately after the power source has been turned on, either a fixed value or a value in accordance with the output of a photometry means (not shown in the drawing) is set as the accumulation time, and in cases other than immediately after the power source is turned on, the accumulation time TAN, determined using equation 2 in step S105 which is explained below, is used. The accumulation time at this point is stored in memory as TAP.

In step S102, the subject image signals from first light receptors 80 and 81 are transmitted, signals from each pixel are A/D converted, and the data that has been A/D converted is stored in memory. In step S103, a commonly known double image detection computation is performed based on the obtained A/D converted data, and the focus adjustment condition of the first focus detection area 36 is detected. In step S104, the peak signal output after the completion of the transmittance of subject image signals is A/D converted, and the peak value PA is found.

In step S105, the next accumulation time TAN is computed using equation 2 based on the peak value PA and the accumulation time TAP and is stored in memory, and the microcomputer advances to step S106. In step S106, the time on the timer is detected, and the determination is made as to whether or not a certain time interval has elapsed. If this certain time interval has not elapsed, the microcomputer returns to step S101 and repeats the actions described above. When this certain time interval has elapsed, the timer is reset, and the microcomputer advances to step S107.

In step S107, the charge accumulation action is performed in second light receptors 82 and 83 corresponding to the focus detection area that has not been selected, that is to say, the second focus detection area 37 in this case. Immediately after the power source has been turned on, either a preset value or a value in accordance with the output of a photometry means (not shown in the drawing) is set as the accumulation time, and in cases other than immediately after the power source is turned on, the accumulation time TBN, determined using equation 2 in step S110 which is explained below, is used. The accumulation time at this point is stored in memory as TBP.

In step S108, the subject image signals from second light receptors 82 and 83 are transmitted, and in step S109, the peak signal output after the completion of the transmittance of these subject image signals is A/D converted, and the peak value PB is found. In step S110, the next accumulation time TBN is computed using equation 2 based on the peak value PB and the accumulation time TBP and is stored in memory, after which the microcomputer returns to step S101 and repeats the actions described above.

When the area selection device 11 is changed during the repeating of these actions, the actions associated with first light receptors 80 and 81 and second light receptors 82 and 83 in the explanation above are switched with each other.

In the actions described above, a time is set on the timer that is sufficiently longer than the focus detection cycle in the selected focus detection area (the time for the actions from step S101 through step S106 in FIG. 6).

Instead of using the timer to measure a specific time interval, it would also be possible to branch to step S107 after it is detected that a preset number of focus detection cycles from step S101 through step S106 have been performed.

In addition, it would also be possible to change the preset time interval or the preset number of cycles in accordance with the brightness determined in accordance with the output of the photometry sensor and the accumulation time of the light receptors.

In this case, because the accumulation time would become longer during dim times, when the light receptors corresponding to the non-selected area are operated, the responsiveness of the focus detection action with respect to the selected area would drop. Therefore, it would also be possible to perform the actions described above only when the brightness exceeds a certain level, and to not perform the actions for the light receptors corresponding to the non-selected area when the brightness does not reach this preset level.

On the other hand, because the accumulation time would be shorter during bright times and it would not require much time for the output level of the image sensor to reach the maximum level when the selected area is changed, it would be possible to perform the actions described above only when the brightness was below a preset level, and to not perform the actions in the light receptors corresponding to the non-selected areas when it was above this level.

Furthermore, in the flowcharts shown in FIGS. 6 and 7, the subject image signals from each pixel in the light receptors corresponding to the non-selected areas are not A/D converted, and accordingly, focus detection computation is not performed, but it would also be possible to A/D convert the subject image signals from each pixel in the light receptors corresponding to the non-selected areas and to perform focus detection computations.

Figure 8:
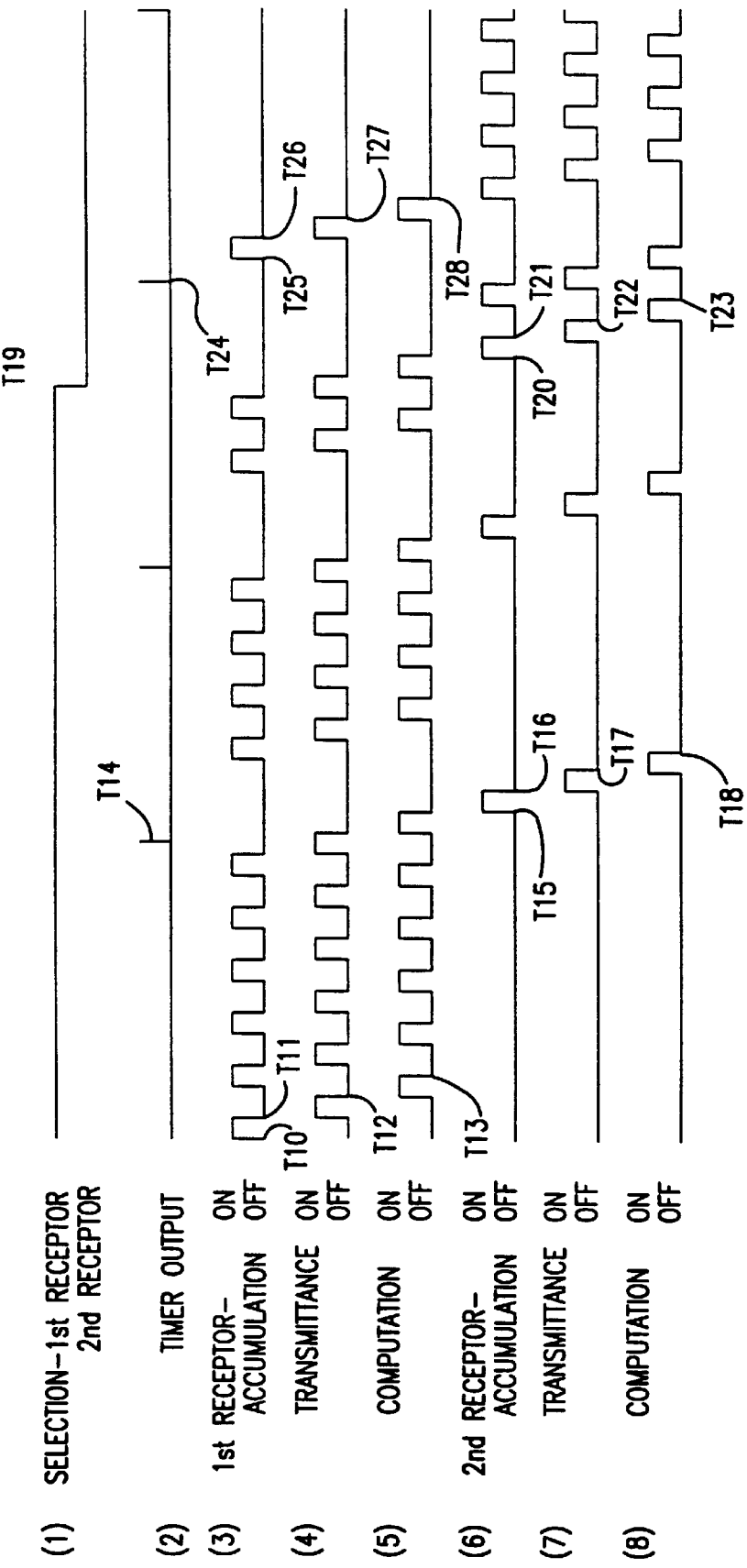
FIG. 8 is a time chart showing the actions of the first embodiment.

FIG. 8 is a time chart of the actions of the first embodiment.

The first signal is a signal indicating the light receptors corresponding to the focus detection area selected by the area selection device 11, and when it is Hi, first light receptors 80 and 81 have been selected while when it is Lo, second light receptors 82 and 83 have been selected. The second signal is the timing signal of the timer, and it generates a pulse each time a certain time interval has elapsed. The third signal is the accumulation action signal of first light receptors 80 and 81, with ON indicating that accumulation is underway, while OFF indicates that accumulation is not underway. The fourth signal is the transmittance action signal of first light receptors 80 and 81, with ON indicating that transmittance of the subject image signals is underway while OFF indicates that transmittance is not underway. The fifth signal is the computation action signal of first light receptors 80 and 81, with ON indicating that the focus detection computation or accumulation time computation is being performed based on the subject image signals from first light receptors 80 and 81, while OFF indicates that these computations are not being performed. The sixth through eighth signals correspond to the third through fifth signals but for second light receptors 82 and 83.

At time T10, accumulation is started in first light receptors 80 and 81. At time T11, accumulation is completed in first light receptors 80 and 81, and transmittance of the subject image signals is started. At time T12, transmittance of the subject image signals from first light receptors 80 and 81 is completed, and computations are started. At time T13, computations related to first light receptors 80 and 81 are completed, and accumulation in first light receptors 80 and 81 is again started.

While the actions described above are repeatedly performed, a preset time interval elapses and the timer produces a pulse at time T14. After this pulse signal has been produced by the timer, accumulation is started in second light receptors 82 and 83 at time T15 as the computations for first light receptors 80 and 81 are completed. At time T16, accumulation is completed in second light receptors 82 and 83, and the transmittance of subject image signals is started. At time T17, transmittance of the subject image signals from second light receptors 82 and 83 is completed, and computations are started. At time T18, computations related to second light receptors 82 and 83 are completed, and accumulation in first light receptors 80 and 81 is again started.

When the area selection device is switched at time T19 while the actions above are being repeated, accumulation is started in second light receptors 82 and 83 at time T20 immediately following the area change, and computations related to first light receptors 80 and 81 are terminated. At time T21, accumulation is completed in second light receptors 82 and 83, and the transmittance of subject image signals is started. At time T22, transmittance of the subject image signals from second light receptors 82 and 83 is completed, and computations are started. At time T23, computations related to second light receptors 82 and 83 are completed, and accumulation in second light receptors 82 and 83 is again started.

While the actions described above are repeatedly performed, a preset time interval elapses and the timer produces a pulse at time T24. After this pulse signal has been produced by the timer, accumulation is started in first light receptors 80 and 81 at time T25 as the computations for second light receptors 82 and 83 are completed. At time T26, accumulation is completed in first light receptors 80 and 81, and the transmittance of subject image signals is started. At time T27, transmittance of the subject image signals from first light receptors 80 and 81 is completed, and computations are started. At time T28, computations related to first light receptors 80 and 81 are completed, and accumulation in second light receptors 82 and 83 is again started.

In this way, in the first embodiment, the focus detection actions of accumulation, transmittance and computation in the light receptors that correspond to the focus detection area selected by the area selection device 11 are performed more frequently than the focus detection actions for the light receptors that correspond to the focus detection areas not selected.

Through this, the charge accumulation control cycle of the photoelectric converters that correspond to the selected area becomes longer than the charge accumulation control and focus detection cycle of the selected area, the burden on the microcomputer of accumulation control in non-selected areas is eased, and it becomes possible to maintain responsiveness in normal focus detection for the selected area. In addition, because the accumulation time of the photoelectric converters that correspond to the changed focus detection area is controlled prior to the change so that the level of the subject image signal is suitable for focus detection computation, exact focus detection becomes possible immediately after the focus detection area is changed, and the responsiveness of focus detection is improved.

Second Embodiment

A second embodiment of the present invention will now be described. The structure of the second embodiment is the same as the structure of the first embodiment shown in FIG. 1, so explanation of such is omitted here.

In the first embodiment, the focus detection actions for the light receptors corresponding to the focus detection area that is not selected are performed at a certain time interval, while in contrast, in the second embodiment, the focus detection actions for the light receptors corresponding to the selected focus detection area and the focus detection actions for the light receptors corresponding to the non-selected focus detection areas are performed in parallel, and when the actions clash (for instance, accumulation is performed simultaneously, but transmittance and computations are not performed simultaneously), the actions for the focus detection area that has been selected are given priority. In other words, the transmittance of accumulated charge and focus detection computations for the light receptors corresponding to the non-selected areas are performed during accumulation in the light receptors corresponding to the selected focus detection area.

Figure 9:
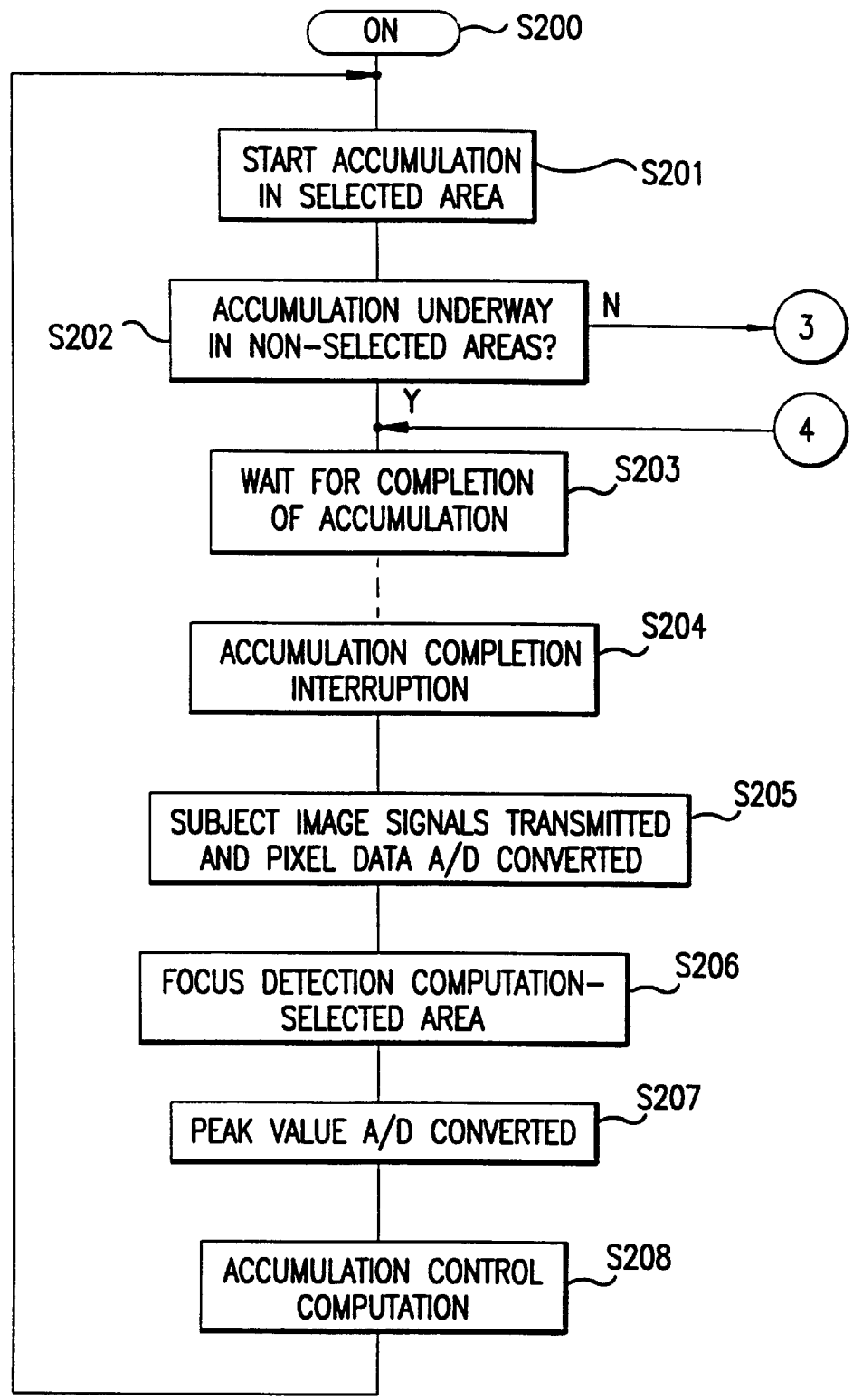
FIG. 9 is a flowchart of the actions of the microcomputer in a second embodiment.
Figure 10:
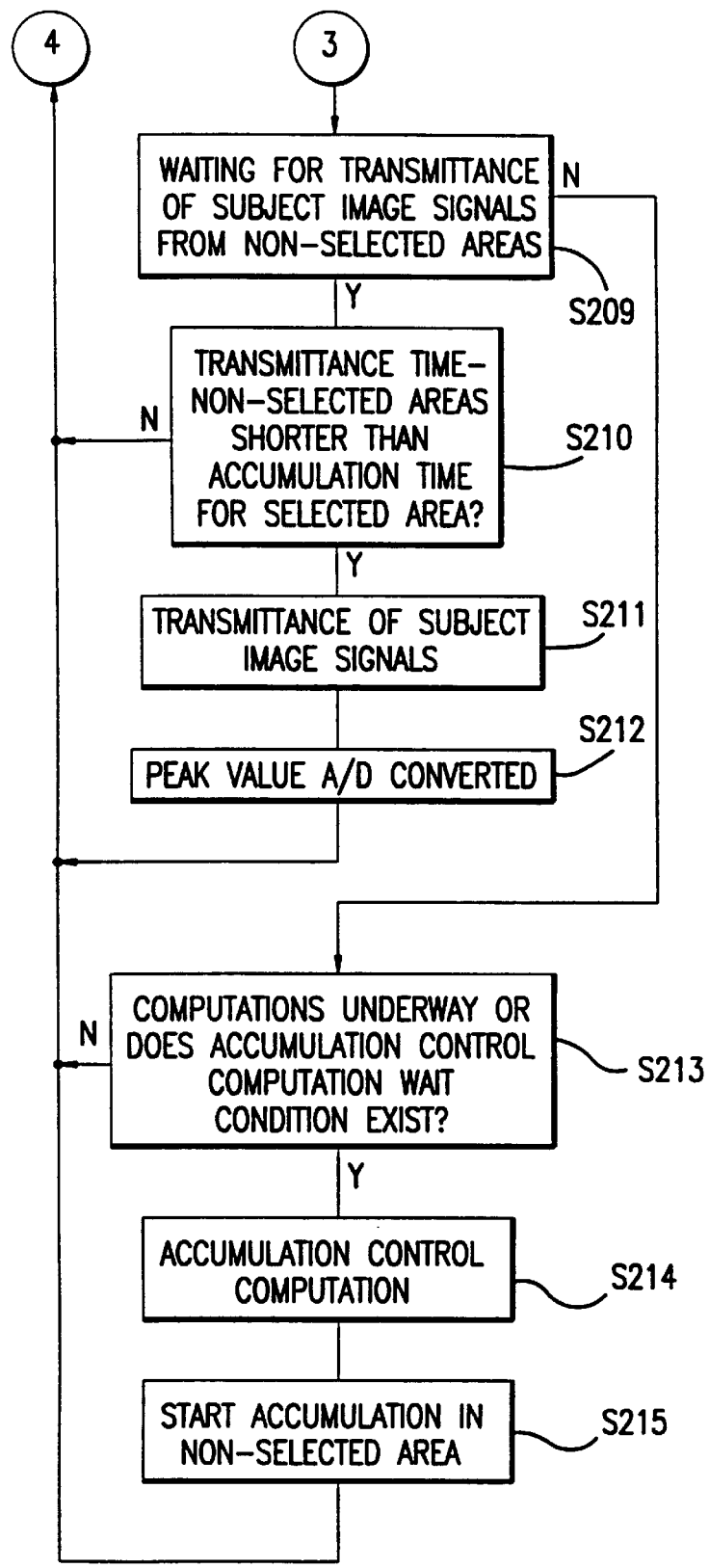
FIG. 10 is a flowchart of the actions of the microcomputer in the second embodiment, following FIG. 9.
Figure 11:
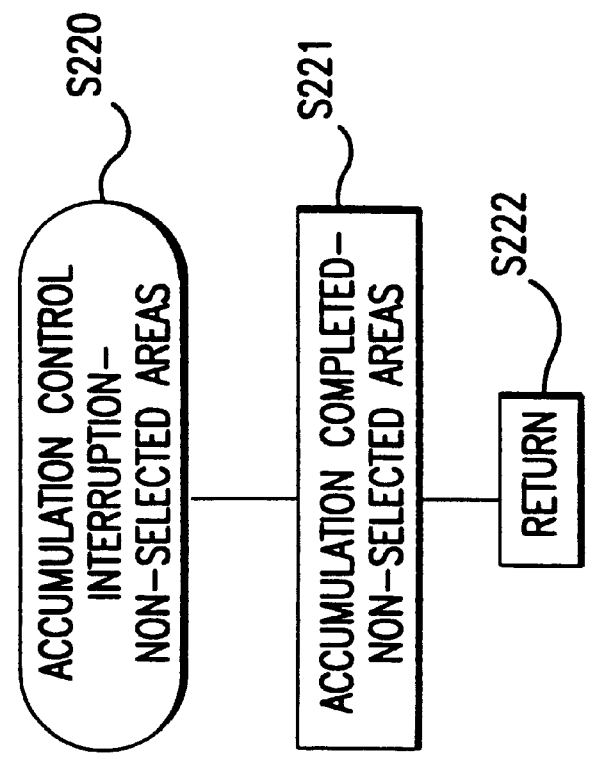
FIG. 11 is a flowchart showing the accumulation control interruption routine of the light receptor corresponding to the non-selected area in the second embodiment.

FIGS. 9 through 11 are flowcharts of the actions of the microcomputer 90 in the second embodiment. The actions of the second embodiment will be described using these flowcharts. Here, the example will be explained assuming that the first focus detection area 36 has been selected.

In step S200, the microcomputer advances to step S201 when the power source is turned on. At this time, a preset time is set on timer B, and accumulation is started in second light receptors 82 and 83. In step S201, accumulation is started in the light receptors that correspond to the focus detection area selected by the area selection device 11. In this case, charge accumulation is started in first light receptors 80 and 81. The accumulation time is managed by a built-in timer A. For instance, the reset time on timer A is set prior to the start of accumulation, timer A is started simultaneously with the start of accumulation, and timer A is interrupted when this preset time is reached. Because equation 2 described above cannot be applied immediately after the power source is turned on, the accumulation time is set to either a fixed value or a value corresponding to the output of a photometry means (not shown in the drawing), and in cases other than immediately after the power source is turned on, the accumulation time TAN, determined from equation 2, which is explained below, is used. The accumulation time at this point is stored in memory as TAP.

In step S202, the determination is made as to whether or not accumulation is underway in second light receptors 82 and 83, and if accumulation is underway, the microcomputer advances to step S203 and waits for the completion of accumulation in first light receptors 80 and 81 (the interruption of timer A). In step S204, when the accumulation completion interruption (the interruption of timer A) occurs in first light receptors 80 and 81, charge accumulation is terminated in first light receptors 80 and 81. In step S205, the subject image signals from each pixel in first light receptors 80 and 81 are transmitted and are A/D converted, and the A/D converted data is stored in memory. In step S206, the commonly known double image detection computation is performed based on the obtained A/D converted data, and the focus adjustment condition in the first focus detection area 36 is detected. In step S207, the peak signal output upon the completion of transmittance of the subject image signals is A/D converted, and the peak value PA is found. In step S208, the next accumulation time TAN is computed based on equation 2 using the peak value PA and the accumulation time TAP, and this value is stored in memory, following which the microcomputer returns to step S201 and repeats the actions described above.

When accumulation is not underway in second light receptors 82 and 83 in step S202, the microcomputer advances to step S209. In step S209, the determination is made as to whether or not accumulation has been completed in second light receptors 82 and 83 and whether or not a transmittance wait condition exists, and if a transmittance wait condition exists, the microcomputer advances to step S210.

In step S210, a determination is made as to whether or not the transmittance time of the subject image signals from second light receptors 82 and 83 is shorter than the accumulation time of first light receptors 80 and 81, and if it is shorter, the microcomputer advances to step S211 to perform transmittance, while if it is longer, the microcomputer returns to step S203 without performing transmittance of the subject image signals from second light receptors 82 and 83 because the transmittance of the subject image signals from first light receptors 80 and 81 would start during the transmittance of subject image signals from second light receptors 82 and 83.

In step S211, the subject image signals from second light receptors 82 and 83 are transmitted, and in the following step S212, the peak signal output upon the completion of the transmittance of subject image signals is A/D converted, the peak value PB is detected, and the microcomputer then returns to step S203.

On the other hand, if a transmittance wait condition does not exist in step S209, the microcomputer advances to step S213, and a determination is made as to whether or not either computations are underway or an accumulation time computation wait condition exists with regards to second light receptors 82 and 83. If either computations are underway or an accumulation time computation wait condition exists, the microcomputer advances to step S214, detects the next accumulation time TBN based on equation 2 using the peak value PB and the accumulation time TBP, and stores it in memory. In step S215, accumulation is started in second light receptors 82 and 83. The accumulation time for second light receptors 82 and 83 is managed by built-in timer B. A preset time for timer B is set prior to the start of accumulation, the timer B is started simultaneously with the start of accumulation, and timer B is interrupted when the preset time is reached. The accumulation time TBN determined in step S214 using equation 2 is used as the accumulation time. The accumulation time at this point is stored in memory as TBP, and the microcomputer returns to step S203.

If interruption of timer A occurs during the processes in steps S214 and S215, the condition of second light receptors 82 and 83 is set as computations being underway, and the microcomputer advances to step S204.

In step S220 of FIG. 11, when an accumulation completion interruption (interruption of timer B) occurs in second light receptors 82 and 83, accumulation in second light receptors 82 and 83 is terminated in step S221, and in step S222, the microcomputer returns to the programs shown in FIGS. 9 and 10.

When the area selection device 11 is changed while these actions are being repeated, the actions for first light receptors 80 and 81 and the actions for second light receptors 82 and 83 in the above explanation are switched.

In addition, in the flowcharts in FIGS. 9 through 11, the subject image signals from each pixel in the light receptors corresponding to the non-selected areas are not A/D converted, and accordingly, a focus detection computation is not performed, but it would be possible for the subject image signals from each pixel in the light receptors corresponding to the non-selected areas to be A/D converted and for a focus detection computation to be performed.

Figure 12:
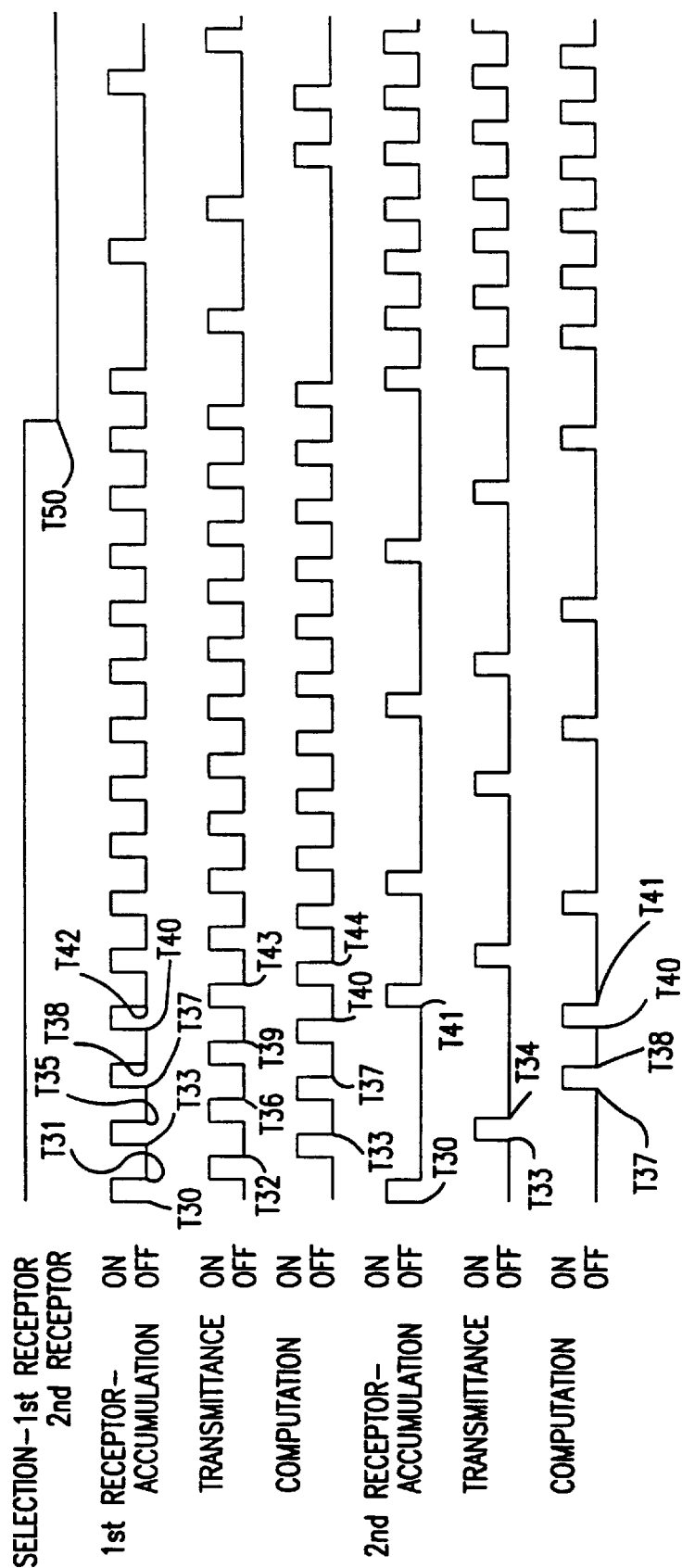
FIG. 12 is a time chart showing the actions of the second embodiment.

FIG. 12 is a time chart of the actions of the second embodiment.

At time T30, accumulation is started in first light receptors 80 and 81 and in second light receptors 82 and 83. At time T31, accumulation is completed in first light receptors 80 and 81, and transmittance of the subject image signals is started. At time T32, transmittance of the subject image signals from first light receptors 80 and 81 is completed, and computations are started. At time T33, computations related to first light receptors 80 and 81 are completed, and accumulation is again started in first light receptors 80 and 81, and simultaneously, transmittance of the subject image signals from second light receptors 82 and 83 is started. At time T34, transmittance of the subject image signals from second light receptors 82 and 83 is completed. At time T35, accumulation is completed in first light receptors 80 and 81, and transmittance of the subject image signals is started. At time T36, the transmittance of subject image signals from first light receptors 80 and 81 is completed, and computations are started. At time T37, computations related to first light receptors 80 and 81 are completed, and accumulation is again started in first light receptors 80 and 81, and simultaneously, computations related to second light receptors 82 and 83 are started. At time T38, accumulation in first light receptors 80 and 81 is completed, and transmittance of the subject image signals is started, and simultaneously, the computations related to second light receptors 82 and 83 are halted. For this case, the presumption is that the computation time for second light receptors 82 and 83 is longer than the accumulation time of first light receptors 80 and 81. At time T39, transmittance of the subject image signals from first light receptors 80 and 81 is completed, and computations are started. At time T40, computations related to first light receptors 80 and 81 are completed, and accumulation is again started in first light receptors 80 and 81, and simultaneously, computations related to second light receptors 82 and 83 are again started. At time T41, computations related to second light receptors 82 and 83 are completed.

By repeating the actions described above, the focus detection actions for second light receptors 82 and 83 are performed in between the focus detection actions of first light receptors 80 and 81.

When the area selection device 11 is changed at time T50 while the above actions are being repeated, the focus detection actions for first light receptors 80 and 81 and for second light receptors 82 and 83 as described above are reversed.

In the second embodiment as described above, the focus detection actions of charge accumulation, transmittance and focus detection computation in the light receptors corresponding to the focus detection area selected by the area selection device 11 are given priority over the focus detection actions in the light receptors corresponding to the non-selected focus detection areas.

Through this, the responsiveness of the focus detection action with respect to the focus detection action in the selected area does not decline, and in addition, because the accumulation time of the photoelectric converters that correspond to the changed focus detection area is controlled prior to the change so that the level of the subject image signal is suitable for focus detection computation, the responsiveness of focus detection is improved.

Third Embodiment

A third embodiment of the present invention will now be described. The structure of the third embodiment is basically the same as the structure of the first embodiment shown in FIG. 1, and only the differences will be explained.

In the first embodiment, the accumulation action is performed even in the light receptors corresponding to the non-selected focus detection areas, and accumulation time is controlled. In contrast, in the third embodiment, the accumulation action is not performed in the light receptors corresponding to non-selected focus detection areas, and responsiveness when the focus detection area is changed is improved by monitoring the output of light quantity monitor light receptor elements provided near the light receptors.

Figure 13:
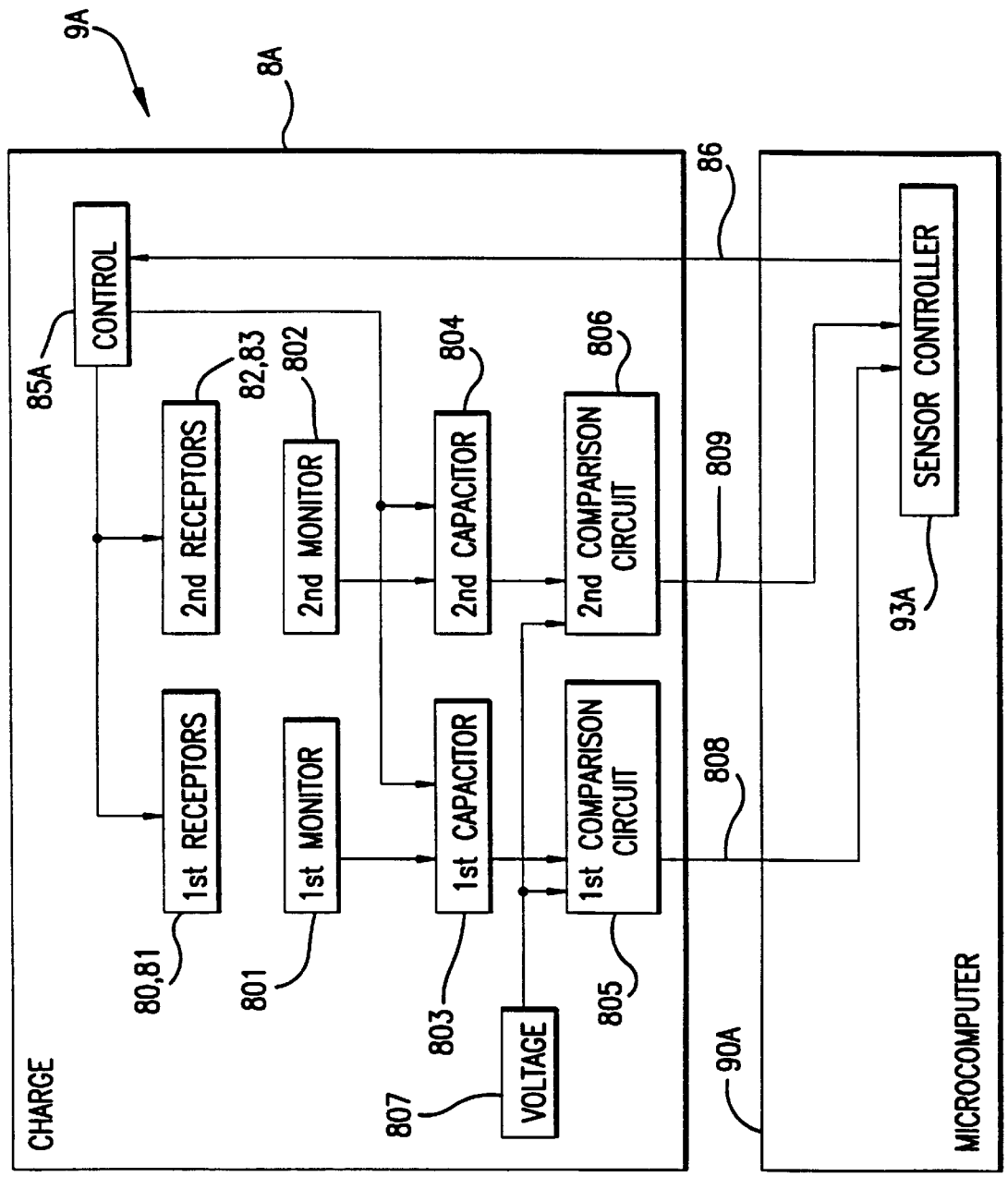
FIG. 13 is a block diagram showing the structure of a third embodiment.

FIG. 13 is a block drawing showing the structure of the third embodiment. The focus detection optical system 7 is omitted from the drawing in FIG. 13.

The focus detection device 9A of the third embodiment, in contrast to the focus detection device 9 of the first embodiment, is provided with a first monitor light receptor element 801 located near one of first light receptors 80 and 81, a second monitor light receptor element 802 located near one of second light receptors 82 and 83, a first capacitor 803 and a second capacitor 804 for accumulating electric charge produced by each of the monitor light receptor elements 801 and 802, a preset voltage generation circuit 80, a first comparison circuit 805, and a second comparison circuit 806 for comparing the preset voltage with the output of each capacitor.

The first monitor 801 and the second monitor 802 generate an electric charge in accordance with the quantity of incident light. The charge that is generated is accumulated in the first capacitor 803 and the second capacitor 804, respectively, and a voltage in accordance with the accumulated amount of charge is generated. The accumulated charge in the first capacitor 803 and the second capacitor 804 is reset by the control circuit 85A.

The voltage generated by the first capacitor 803 and the second capacitor 804 is compared to the preset voltage by the first comparison circuit 805 and the second comparison circuit 806, and when the generated voltage exceeds the preset voltage, the comparison result signals are reversed. The comparison result signals are each output to the sensor controller 93A of the microcomputer 90A via output lines 808 and 809, respectively. Accordingly, the sensor controller 93A, through line 86, measures the time from when the first capacitor 803 and the second capacitor 804 are reset by the control circuit 85A until each comparison signal is reversed, and through this, information can be obtained relating to the brightness of first light receptors 80 and 81 and second light receptors 82 and 83.

Figure 15:
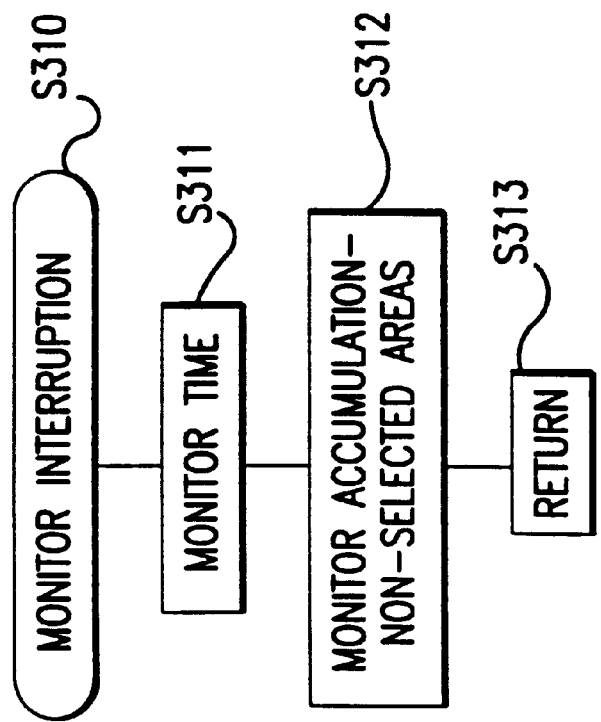
FIG. 15 is a flowchart showing the monitor interruption routine of the third embodiment.
Figure 14:
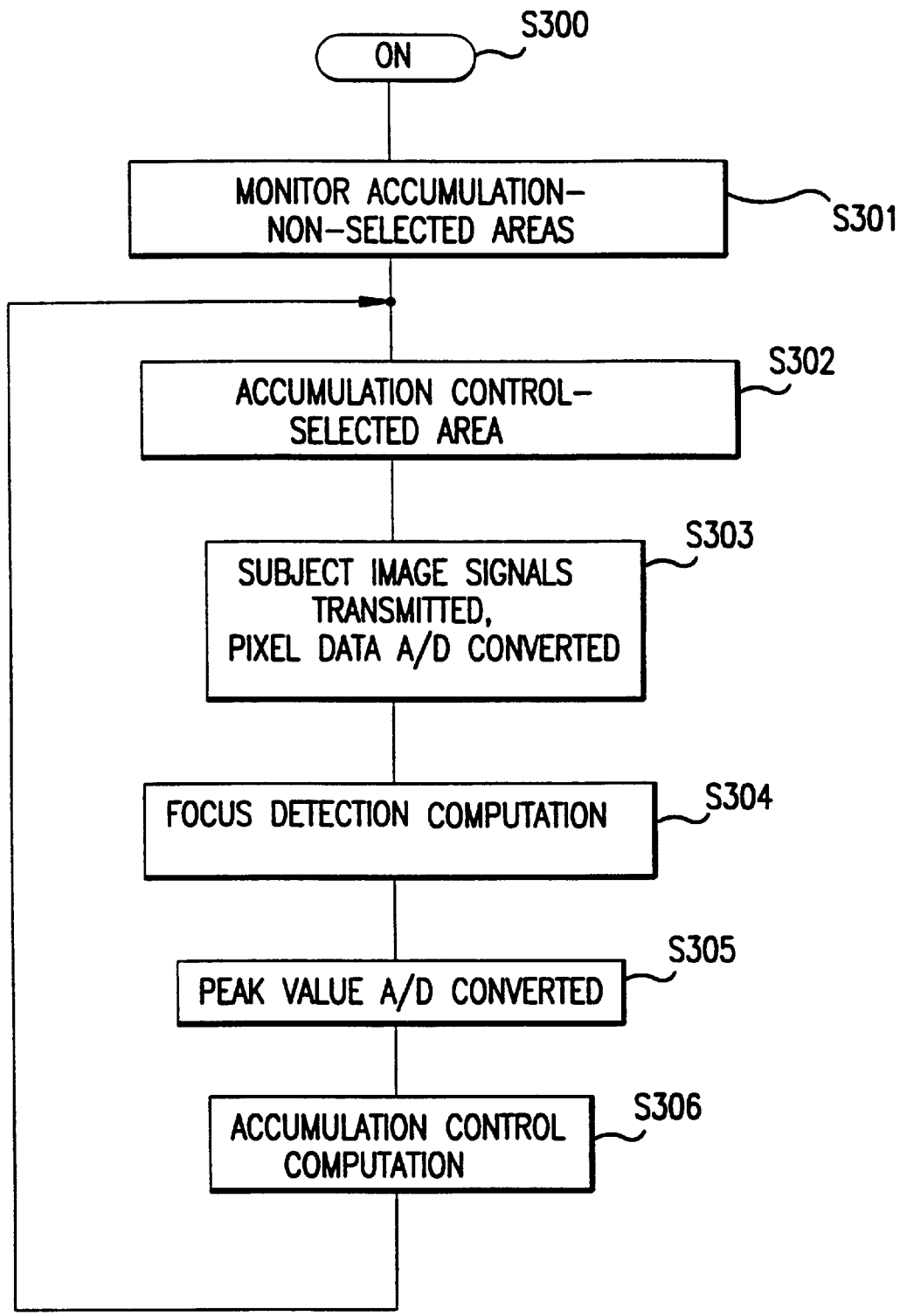
FIG. 14 is a flowchart of the actions of the microcomputer in the third embodiment.

FIGS. 14 and 15 are flowcharts of the operation of the microcomputer 90A in the third embodiment. Hereinafter, it is assumed that the first focus detection area 36 is selected.

In step S300, the microcomputer advances to step S301 when the power source is turned on. At this time, the timer built into the microcomputer 90A is also started. In step S301, the charge accumulated in the capacitor of the monitor light receptor element near the light receptors corresponding to the non-selected focus detection area is reset. Here, because the second focus detection area 37 has not been selected, the second capacitor 804 is reset. Furthermore, the charge generated by the second monitor light receptor element 802 starts to accumulate in the second capacitor 804, and the built-in timer is reset and started.

In step S302, control is performed on the accumulation time of the light receptors corresponding to the focus detection area selected by the area selection device 11. Charge accumulation action in first light receptors 80 and 81 is performed. Because equation 2 cannot be applied immediately after the power source is engaged, the accumulation time is set to a fixed value or a value that corresponds to the output of a photometry element (not shown in the drawing), and in cases other than immediately after the power source has been engaged, the accumulation time TAN, determined using equation 2 in step S306, which is explained below, is used. The accumulation time at this time is stored in memory as TAP.

In step S303, the subject image signals from each pixel in first light receptors 80 and 81 are transmitted and A/D converted, and the A/D converted data is stored in memory. In the following step S304, the commonly known double image detection computation is performed based on the obtained A/D converted data, and the focus adjustment condition in the first focus detection area 36 is detected. In step S305, the peak signal output upon completion of the transmittance of subject image signals is A/D converted, and the peak value PA is found. In step S306, the next accumulation time TAN is computed based on equation 2 using the peak value PA and the accumulation time TAP, and this value is stored in memory. The microcomputer returns to step S301 and repeats the actions described above.

When the output voltage of the second capacitor 804 reaches the preset voltage, the comparison result signal from the second comparison circuit 806 is reversed, and interruption of the monitor occurs in step S310 because of this signal.

In step S311, the time on the built-in timer is stored in memory as the brightness information from the non-selected focus detection area. In the following step S312, accumulation is completed in the monitor light receptor element near the light receptors that correspond to the non-selected focus detection area, and the charge accumulated in the corresponding capacitor is reset. Here, because the second focus detection area 37 is not selected, the second capacitor 804 is reset. Furthermore, the charge generated by the second monitor light receptor element 802 starts to accumulate in the second capacitor 804, the built-in timer is reset and started, and the microcomputer returns to the operation illustrated in FIG. 14 from step S313.

When the area selection device 11 is changed while the above actions are being repeated, the actions for first light receptors 80 and 81 and the actions for second light receptors 82 and 83 in the explanation above are switched.

Immediately after the actions of first light receptors 80 and 81 and the actions of second light receptors 82 and 83 have been switched, the accumulation time for the light receptors corresponding to the focus detection area selected by the area selection device 11 is determined based on the brightness information obtained from the monitor light receptor elements, which is stored in memory.

In this way, in the third embodiment, the focus detection actions of charge accumulation, transmittance and focus detection computation are not performed in the light receptors that correspond to the focus detection area not selected by the area selection device 11, but the brightness information from this focus detection area is monitored by the corresponding monitor light receptor element. Furthermore, when the focus detection area is changed, charge accumulation is performed by determining the accumulation time in the newly selected light receptor based on the brightness information stored in memory.

Through this, charge accumulation control becomes unnecessary in the photoelectric converters that correspond to the non-selected areas, easing the burden on the microcomputer and making it possible to maintain the responsiveness of the focus detection action in the selected areas. In addition, because the accumulation time in the photoelectric converters that correspond to the changed focus detection area is controlled prior to the change based on the results of monitoring of these photoelectric converters so that the level of the subject image signal is suitable for focus detection computation beforehand, responsiveness is improved.

In each of the first, second and third embodiments explained above, the example was presented wherein two focus detection areas were provided, but the number of focus detection areas is not limited to the embodiments explained above, and the present invention can be applied to focus detection devices having three or more focus detection areas.

Figure 16:
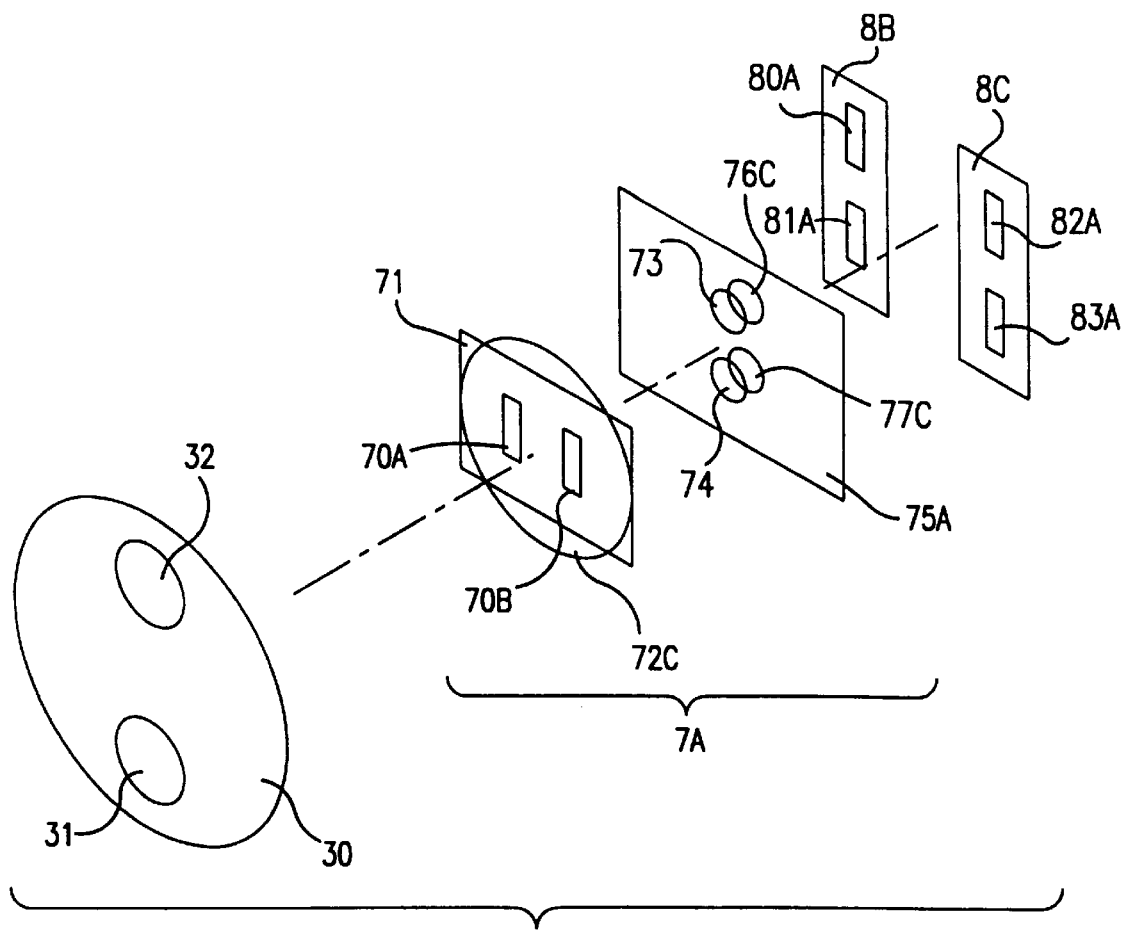
FIG. 16 is an oblique view showing alternative structures for the focus detection optical system and the charge accumulation type image sensor.

In addition, the structures of the focus detection optical system 7 and of the image sensor 8 are not limited to those shown in FIG. 2, but the same results can be obtained using a structure such as shown in FIG. 16, for instance. Elements in FIG. 16 that are the same as elements shown in FIG. 2 are marked with the same symbols, and an explanation of such is omitted.

The focus detection optical system 7A is equipped with a field of vision mask 71 containing apertures 70A and 70B, a condenser lens 72C, a diaphragm mask 75A having a pair of diaphragm apertures 73 and 74, and a pair of reimaging lenses 76C and 77C. The charge accumulation type image sensors 8B and 8C are each equipped with a pair of light receptors 80A and 81A, and 82A and 83A.

In the structure described above, the pair of diaphragm apertures 73 and 74 are focused by the condenser lens 72C onto a pair of regions 31 and 32, symmetric with respect to the optical axis, on the surface 30 near the exit pupil of the photography optical system 3. Light that passes through these regions is formed first into a primary image in the vicinity of the field of vision mask 71. The primary image formed on the apertures 70A and 70B of the field of vision mask 71 passes through the condenser lens 72C and the pair of diaphragm apertures 73 and 74, and is formed as two pairs of secondary images by the pair of reimaging lenses 76C and 77C on the light receptors 80A and 81A of charge accumulation type image sensor 8B and on the light receptors 82A and 83A of charge accumulation type sensor 8C. The relationship between the relative positions of the pair of secondary images on light receptors 80A and 81A and the relationship between the relative positions of the pair of secondary images on light receptors 82A and 83A changes according to the focus condition of the photography optical system 3. The light intensity distribution of the two pairs of secondary images is photoelectrically converted by light receptors 80A and 81A and light receptors 82A and 83A and is output as electrical subject image signals. By detecting the relative positions of these pairs of secondary images based on these subject image signals, it is possible to detect the focus adjustment condition of the photography optical system 3.

Fourth Embodiment

A fourth embodiment of the present invention will now be described. The structure of the fourth embodiment is basically the same as the structure of the first embodiment, and only the structure and actions of the focus detection optical system differ. Here, the explanation given will be centered on the differences.

In the first embodiment, the area selection device 11 selected the focus detection area in which focus detection is performed from a plurality of focus detection areas. In contrast, in the fourth embodiment, a plurality of focus detection blocks each composed of a plurality of focus detection areas are provided, and the area selection device 11 selects the focus detection block in which focus detection is performed from the plurality of focus detection blocks. Furthermore, in focus detection blocks not selected, the action of charge accumulation is only performed in the light receptors corresponding to a specific focus detection area that belongs to this block.

Figure 17:
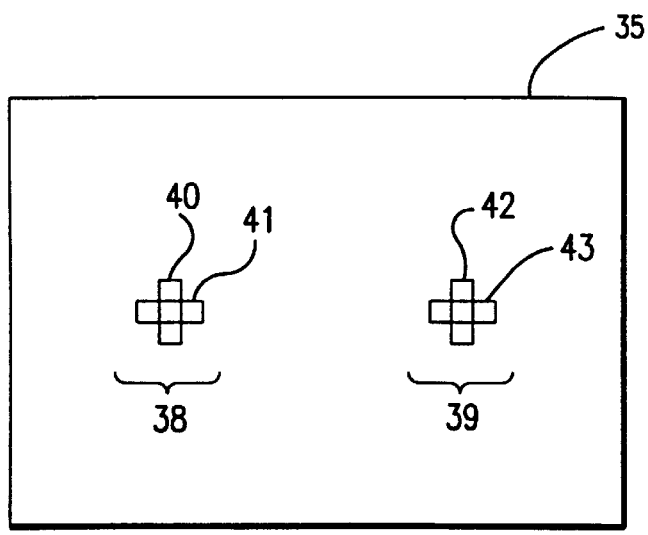
FIG. 17 is a drawing showing the positioning of the focus detection regions on the photography screen in a fourth embodiment.

FIG. 17 shows the arrangement of focus detection areas in the fourth embodiment.

On the photography screen 35 are provided a first focus detection block 38 in which focus detection areas 40 and 41 are arranged in the shape of a cross and a second focus detection block 39 in which focus detection areas 42 and 43 are arranged in the shape of a cross.

Figure 18:
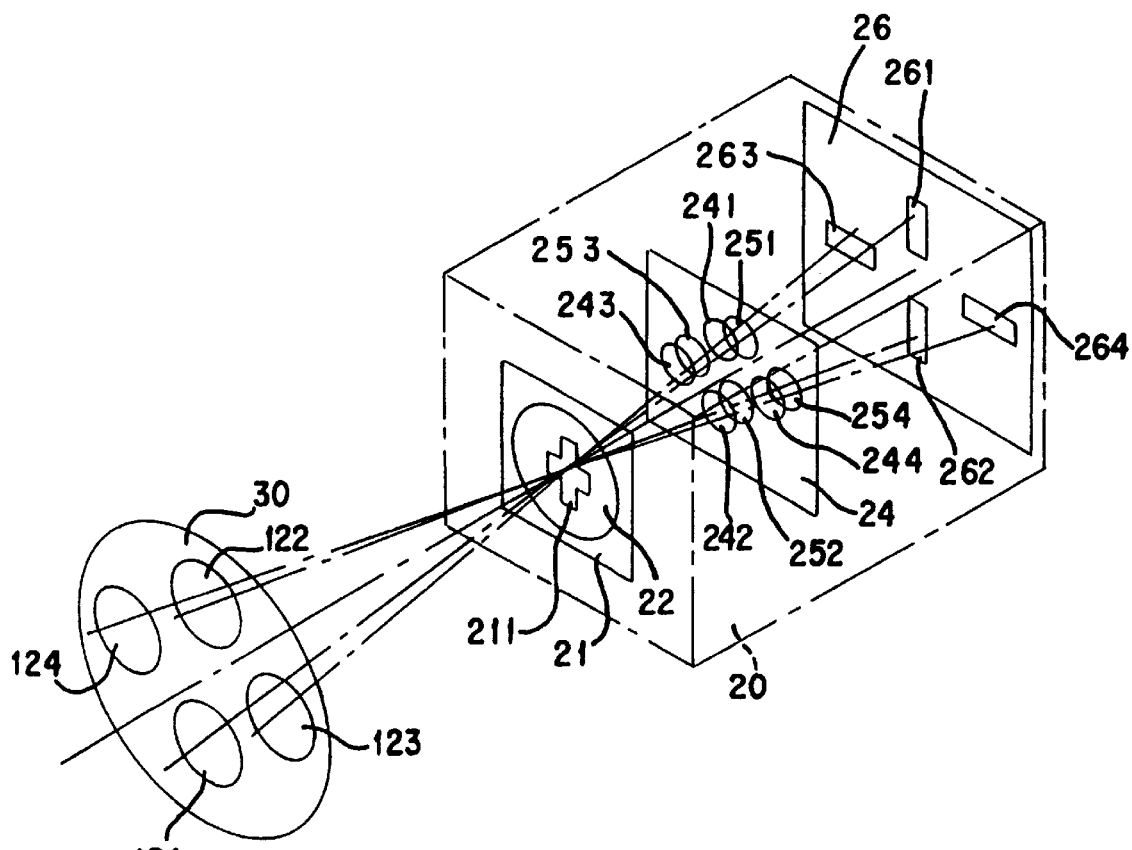
FIG. 18 is an oblique view showing the structure of the focus detection module in the fourth embodiment.

FIG. 18 shows an example of a focus detection optical system used to form the cross-shaped focus detection blocks.

Focus detection module 20 is composed of a field of vision mask 21 having a cross-shaped aperture 211, a condenser lens 22, a diaphragm mask 24 having two pairs of diaphragm apertures 241, 242, 243 and 244, a focus detection optical system having two pairs of reimaging lenses 251, 252, 253 and 254, and an image sensor 26, such as a CCD or the like, having two pairs of light receptors 261, 262, 263 and 264. The primary image formed on the optical axis by the photography optical system 3 is reimaged into two pairs of secondary images on the two pairs of light receptors 261, 262, 263 and 264. Each of the light receptors 261, 262, 263 and 264 is comprised of a plurality of pixels. The aperture 211 of the field of vision mask is positioned on the optical axis near the intended focus surface, and a focus detection device is provided on the optical axis of the screen.

In the structure described above, the two pairs of diaphragm apertures 241, 242, 243 and 244 are focused by the condenser lens 22 onto two pairs of regions 121, 122, 123 and 124, symmetric with respect to the optical axis, on the surface 12 near the exit pupil of the photography optical system 3. Light that passes through these regions is first formed into a primary image in the vicinity of the field of vision mask 21. The primary image formed on the aperture 211 of the field of vision mask 21 passes through the condenser lens 22 and the two pairs of diaphragm apertures 241, 242, 243 and 244 and is formed into two pairs of secondary images by the two pairs of reimaging lenses 251, 252, 253 and 254 on the two pairs of light receptors 261, 262, 263, and 264 of sensor 26. The light intensity distribution of the two pairs of secondary images is photoelectrically converted by light receptors 261, 262, 263 and 264 and is output as electrical subject image signals.

As is commonly known, by detecting the relative position of the secondary images, of which there is a pair on the sensor 26, in the direction of and also facing the light receptors, using the subject image signals generated by the sensor 26, it is possible to detect a defocus amount between the intended focus surface and the image surface of the photography optical system 3.

Figure 19:
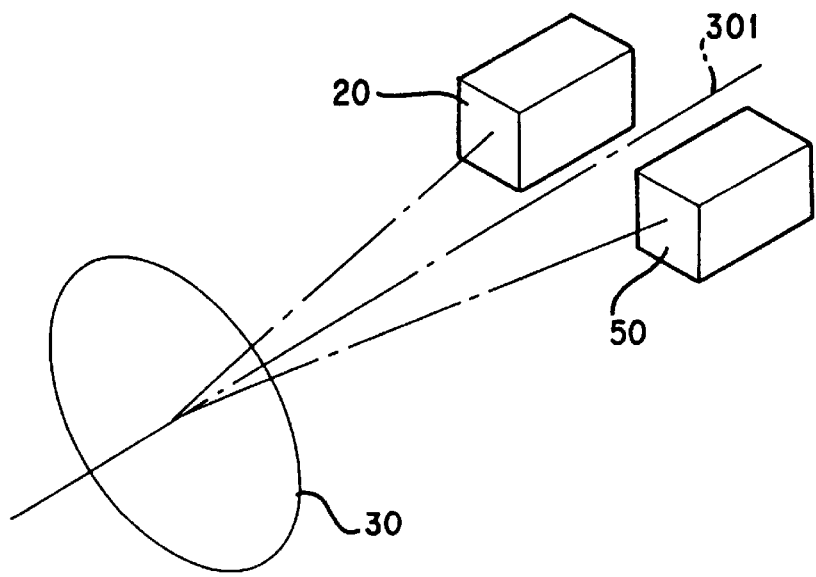
FIG. 19 is an oblique view showing the positioning of the focus detection module in the fourth embodiment.

Focus detection module 20 and focus detection module 50, which have the same structure, are positioned symmetrically with respect to the optical axis 301 as shown in FIG. 19, and thus it is possible to provide the cross-shaped first focus detection block 38 and second focus detection block 39 on the photography screen 35 as shown in FIG. 17.

Figure 20:
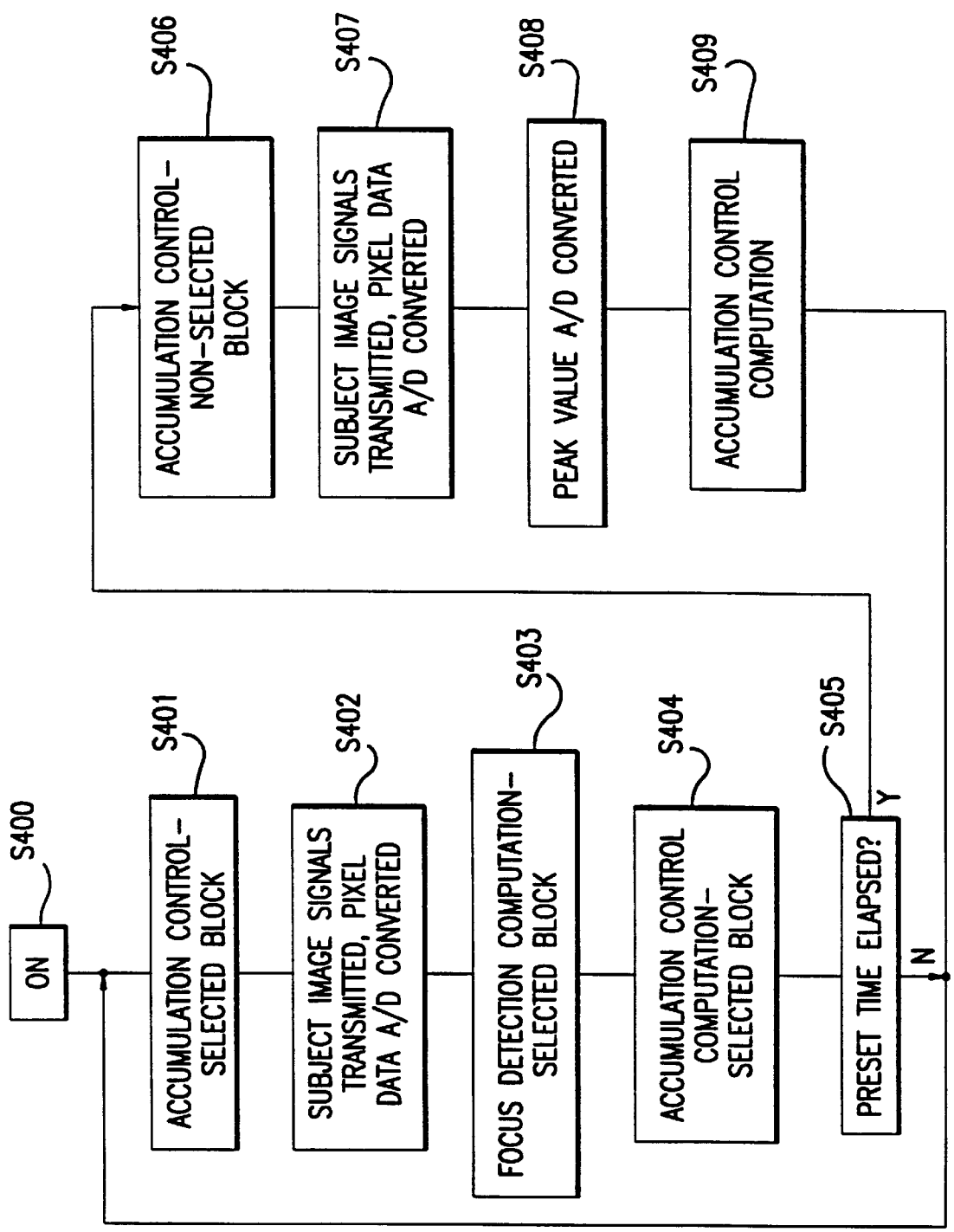
FIG. 20 is a flowchart of the actions of the microcomputer in the fourth embodiment.

FIG. 20 is a flowchart of the operation of the microcomputer 90 in the fourth embodiment. With this flowchart, the operation of the fourth embodiment will be described using as an example the case were the first focus detection block 38 is selected by the area selection device 11.

In step S400, the microcomputer advances to step S401 when the power source is turned on. At this time, the timer built into the microcomputer is started. In step S401, the accumulation time is controlled in the light receptors corresponding to the focus detection areas 40 and 41 that belong to the first focus detection block 38 selected by the area selection device 11. Because equation 2 cannot be applied immediately after the power source has been turned on, either a fixed value or a value in accordance with the output of a photometry means (not shown in the drawing) is set as the accumulation time, and in cases other than immediately after the power source is turned on, the accumulation time determined in each focus detection area using equation 2 in step S404, which is explained below, is used. The accumulation time at this point is stored in memory. In step S402, the subject image signals from the light receptors corresponding to focus detection areas 40 and 41 are transmitted, signals from each pixel are A/D converted, and the data that has been A/D converted is stored in memory. In addition, the peak signal output after the termination of the transmittance of subject image signals is A/D converted, and the peak value is determined. In step S403, a commonly known double image detection computation is performed based on the obtained A/D converted data, and the focus adjustment condition of focus detection areas 40 and 41 is determined.

In step S404, the next accumulation time is computed using equation 2 based on the peak value and the accumulation time and is stored in memory, and the microcomputer advances to step S405. In step S405, the time on the timer is detected, and a determination is made as to whether or not a preset time interval has elapsed. If this preset time interval has not elapsed, the microcomputer returns to step S401 and repeats the actions described above. When this preset time interval has elapsed, the timer is reset, and the microcomputer advances to step S406.

In step S406, of the focus detection areas 42 and 43 that belong to the non-selected focus detection block (i.e., the second focus detection block 39 in this case), the focus detection area 42 in the vertical direction on the screen is set as the representative area, and charge accumulation is performed in the light receptor corresponding to focus detection area 42. Immediately after the power source has been turned on, either a fixed value or a value in accordance with the output of a photometry means (not shown in the drawing) is set as the accumulation time, and in cases other than immediately after the power source is turned on, the accumulation time determined using equation 2 in step S409, which is explained below, is used. The accumulation time at this point is stored in memory. In step S407, the subject image signals from the light receptor corresponding to focus detection area 42 are transmitted, and in step S408, the peak signal output after the termination of the transmittance of these subject image signals is A/D converted, and the peak value is found. In step S409, the next accumulation time is computed using equation 2 based on the peak value PB and the accumulation time TBP and is stored in memory, after which the microcomputer returns to step S401 and repeats the actions described above.

When the area selection device 11 is switched during the repeating of these actions, the actions associated with the light receptors corresponding to the focus detection areas that belong to the first focus detection block 38 and the actions associated with the light receptors corresponding to the focus detection areas that belong to the second focus detection block 39 in the explanation above are switched with each other. That is to say, of the focus detection areas 40 and 41 that belong to the first focus detection block 38, which is the focus detection block that is not selected, the focus detection area 40 in the vertical direction on the screen is selected as the representative area, and the action of charge accumulation is performed only in the light receptor corresponding to focus detection area 40.

Immediately after the actions associated with the light receptors corresponding to the focus detection areas that belong to the first focus detection block 38 and the actions associated with the light receptors corresponding to the focus detection areas that belong to the second focus detection block 39 in the explanation above are switched with each other, the accumulation time for the light receptor corresponding to the focus detection areas that belong to the focus detection block selected by the area selection device 11 is determined based on the accumulation time of the representative area that is stored in memory.

In the actions described above, the preset time is sufficiently longer than the focus detection cycle in the selected focus detection area (the time for the actions from step S401 through step S405). In addition, instead of using a preset time interval, it would also be possible to branch to step S406 after it is detected that a preset number of focus detection cycles from step S401 through step S405 have been performed.

In addition, it would also be possible to change the preset time interval or the preset number of cycles in accordance with the brightness determined based on the output of the photometry sensor and the accumulation time of the light receptors.

In this case, because the accumulation time would become longer during dim times, when the light receptors corresponding to the non-selected areas are operated, the responsiveness of the focus detection action in the selected area would drop. Therefore, it would also be possible to perform the actions described above only when the brightness exceeded a certain level, and to prevent the actions for the light receptors corresponding to the non-selected area when the brightness does not reach this preset level.

On the other hand, because the accumulation time would be shorter during bright times and it would not require much time for the output level of the image sensor to reach the maximum level when the selected area is changed, it would be possible to perform the actions described above only when the brightness was below a preset level, and to prevent the actions in the light receptors corresponding to the non-selected areas when the brightness was above this level.

Furthermore, in the flowchart shown in FIG. 20, the subject image signal from each pixel in the light receptor corresponding to the representative area is not A/D converted, and accordingly, focus detection computation is not performed, but it would also be possible to A/D convert the subject image signals from each pixel in the light receptors corresponding to the non-selected areas and to perform focus detection computations.

In the structure of the embodiments above, the light receptors 80–83 and 80A–83A comprise the photoelectric conversion means; the microcomputers 90 and 90A comprise the focus detection computation means, the accumulation control means and the sequence control means; the area selection device 11 comprises the area selection means; and the output line 87 comprises the transmittance means.

Through this, because in the non-selected block, charge accumulation is performed only in the photoelectric converters corresponding to a specific focus detection area that represents the plurality of focus detection areas, it is not necessary to perform charge accumulation in all of the photoelectric converters corresponding to the plurality of focus detection areas. With respect to focus detection in the selected block, the burden from accumulation control in the non-selected block is eased, making it possible to maintain the high level of responsiveness in normal focus detection actions. In addition to this, because the accumulation time for the photoelectric converters corresponding to the representative focus detection area in the changed focus detection block is controlled prior to the change so that the level of the subject image signal output from these photoelectric converters is suitable for focus detection computation, it is possible for the accumulation time in the photoelectric converters corresponding to the other focus detection areas including this block to make reference to the accumulation time of the photoelectric converters corresponding to the specific focus detection area when the focus detection block is changed, thereby improving responsiveness.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A focus detection device including a plurality of focus detection areas on a photography screen of a photography optical system, the device comprising:

a plurality of charge accumulation type photoelectric converters that are provided in correspondence to said plurality of focus detection areas, said photoelectric converters outputting pairs of image signals corresponding to a light intensity distribution of a subject image formed by the optical system;

focus detection computation means for computing a focus adjustment condition of the photography optical system based on the pairs of image signals output from the photoelectric converters;

accumulation control means for controlling charge accumulation of the photoelectric converters based on at least one image signal from the pair of image signals output from the photoelectric converters;

area selection means for selecting an area where focus detection is performed from among the plurality of focus detection areas; and sequence control means for controlling the accumulation control means, wherein in the photoelectric converters corresponding to the focus detection area selected by the area selection means, the sequence control means controls the accumulation control means to repeatedly perform charge accumulation and wherein the accumulation control means computes a charge accumulation time based on at least one image signal from the pair of image signals output from the photoelectric converters, the device further comprising a plurality of monitor means for outputting a signal corresponding to light intensity incident on each of the photoelectric converters, said sequence control means, in the photoelectric converters corresponding to the non-selected focus detection areas, interrupting charge accumulation and then monitoring the light intensity with the monitor means of the photoelectric converters corresponding to the non-selected focus detection areas.

2. The focus detection device of claim 1, wherein when the focus detection area is changed by the area selection means, the sequence control means controls the accumulation control means to compute a charge accumulation time in accordance with the light intensity monitored by the monitor means of the photoelectric converters upon charge accumulation immediately following the change to the photoelectric converters that correspond to the newly selected focus detection area, and to perform accumulation during the charge accumulation time.

3. A focus detection device having a plurality of focus detection regions in an image field of an optical system, the device comprising:

a plurality of charge accumulation type image sensors corresponding to said plurality of focus detection regions, that output an image signal for detecting a focus adjustment condition of each focus detection region;

a region selector that selects a focus detection region from among the plurality of focus detection regions for focus detection;

an image sensor controller that controls said plurality of charge accumulation type image sensors regardless of their selection state by the region selector, said image sensor controller controlling a charge accumulation time of each of the charge accumulation type sensors so that output of each of the charge accumulation type sensors can be maintained at an appropriate level, regardless of brightness, wherein said image sensor controller computes the charge accumulation time based on image signals output from the charge accumulation type image sensors; and a focus detection computation system that performs a computation process on the image sensor signals repeatedly output from the image sensors corresponding to the selected focus detection region, said focus detection computation system repeatedly detecting the focus adjustment condition of the selected focus detection region.

4. A focus detection method for a focus detection device including a plurality of focus detection areas on a photography screen of a photography optical system, the method comprising:

providing a plurality of charge accumulation type photoelectric converters in correspondence to said plurality of focus detection areas;

outputting, with said photoelectric converters, pairs of image signals corresponding to a light intensity distribution of a subject image formed by the optical system;

computing a focus adjustment condition of the photography optical system based on the pairs of image signals output from the photoelectric converters;

controlling charge accumulation of the photoelectric converters based on at least one image signal from the pair of image signals output from the photoelectric converters;

selecting an area where focus detection is performed from among the plurality of focus detection areas; and computing a charge accumulation time based on at least one image signal from the pair of image signals output from the photoelectric converters, and outputting a signal corresponding to light intensity incident on each of the photoelectric converters, wherein, in the photoelectric converters corresponding to the non-selected focus detection areas, the method comprising interrupting charge accumulation and then monitoring the light intensity in the photoelectric converters corresponding to the non-selected focus detection areas.

5. The focus detection method of claim 4, wherein when the focus detection area is changed, the computing of a charge accumulation time is in accordance with the monitored light intensity of the photoelectric converters upon charge accumulation immediately following the change to the photoelectric converters that correspond to the newly selected focus detection area, and performing charge accumulation during the charge accumulation time.

6. A focus detection method for a plurality of focus detection regions arranged in an image field of an optical system, the method comprising:

selecting a focus detection region from among the plurality of focus detection regions for focus detection;

repeatedly operating a plurality of charge accumulation type image sensors to output an image signal corresponding to said plurality of focus detection regions regardless of the focus detection region selected state;

controlling a charge accumulation time of each of the charge accumulation type sensors so that output of each of the charge accumulation type sensors can be maintained at an appropriate level, regardless of brightness, and computing the charge accumulation time based on image signals output from the charge accumulation type image sensors;

performing a computation process on the image sensor signal repeatedly output from the image sensor corresponding to the selected focus detection region; and repeatedly detecting the focus adjustment condition of the selected focus detection region.

* * * * *